(12) United States Patent
Takahashi et al.

(10) Patent No.: US 7,980,606 B2
(45) Date of Patent: Jul. 19, 2011

(54) VEHICLE BUMPER STRUCTURE

(75) Inventors: Hiroyuki Takahashi, Aichi-ken (JP); Yujiro Miyata, Kariya (JP); Ryotaro Kachu, Aichi-ken (JP); Tetsuya Takafuji, Anjo (JP); Shigenori Kobayashi, Aichi-ken (JP); Yasuyuki Hishida, Hitachi (JP)

(73) Assignees: Toyota Jidosha Kabushiki Kaisha, Toyota-shi, Aichi-ken (JP); Denso Corporation, Kariya, Aichi-Pref (JP); Hitachi Cable, Ltd., Tokyo (JP)

( * ) Notice: Subject to any disclaimer, the term of this patent is extended or adjusted under 35 U.S.C. 154(b) by 200 days.

(21) Appl. No.: 12/279,367

(22) PCT Filed: Feb. 14, 2007

(86) PCT No.: PCT/IB2007/000343
§ 371 (c)(1),
(2), (4) Date: Dec. 18, 2008

(87) PCT Pub. No.: WO2007/093890
PCT Pub. Date: Aug. 23, 2007

(65) Prior Publication Data
US 2009/0322107 A1 Dec. 31, 2009

(30) Foreign Application Priority Data
Feb. 15, 2006 (JP) .................... 2006-038440

(51) Int. Cl.
*B60R 19/48* (2006.01)
(52) U.S. Cl. ........................................ 293/117
(58) Field of Classification Search ............ 293/117, 293/120, 102, 132, 133; 296/203.02, 187.09, 296/187.04; 180/274; 73/800; 280/735
See application file for complete search history.

(56) References Cited

U.S. PATENT DOCUMENTS

| 7,484,779 B2* | 2/2009 | Takahashi ............... 293/117 |
| 2005/0200139 A1* | 9/2005 | Suzuki ................... 293/117 |
| 2007/0114803 A1* | 5/2007 | Takahashi et al. ........ 293/102 |

FOREIGN PATENT DOCUMENTS
DE 103 40 243 A1 4/2004
(Continued)

OTHER PUBLICATIONS

Notification of Reason(s) for Refusal for JP 2008-299897 dated Jul. 27, 2010.
(Continued)

*Primary Examiner* — Joseph D Pape
(74) *Attorney, Agent, or Firm* — Finnegan, Henderson, Farabow, Garrett & Dunner, LLP

(57) ABSTRACT

In a vehicle bumper structure, an optical fiber sensor (32) is provided in a vehicle width direction on the front surface of a front-bumper reinforcement (30). A front-bumper absorber (28) is provided in front of the optical fiber sensor (32), the front-bumper absorber (28) formed of a soft absorber (54) and a hard absorber (56). The hard absorber is disposed at the bumper center region where the thickness of the bumper is increased. Accordingly, the thickness of the soft absorber (54) becomes substantially uniform in the vehicle width direction, so that a substantially uniform load is inputted to the optical fiber sensor (32) regardless of the collision position of the bumper with an object. As a result, variations in the output of the load-sensing unit are reduced.

22 Claims, 22 Drawing Sheets

FOREIGN PATENT DOCUMENTS

| | | |
|---|---|---|
| DE | 20 2004 005 434 U1 | 8/2004 |
| DE | 10 2004 017 270 B3 | 12/2005 |
| EP | 1 574 399 A1 | 9/2005 |
| EP | 1 702 812 A1 | 9/2006 |
| JP | 48-610 | 1/1973 |
| JP | 55-79726 | 6/1980 |
| JP | 62-122848 | 6/1987 |
| JP | 1-309844 | 12/1989 |
| JP | 2000-225907 | 8/2000 |
| JP | 2000-264142 | 9/2000 |
| JP | 2003-267167 | 9/2003 |
| JP | 2004-175338 | 6/2004 |
| JP | 2005-178416 | 7/2005 |

OTHER PUBLICATIONS

Excerpt of "Notification of Reason(s) for Refusal" dated Sep. 24, 2008, in Japanese Patent Application No. 2006-038440.

* cited by examiner

VEHICLE BUMPER STRUCTURE

CROSS-REFERENCE TO RELATED APPLICATIONS

This application is a national phase application of International Application No. PCT/IB2007/000343, filed Feb. 14, 2007, and claims the priority of Japanese Application No. 2006-038440, filed Feb. 15, 2006, the contents of both of which are incorporated herein by reference.

BACKGROUND OF THE INVENTION

1. Field of the Invention

The present invention relates to a vehicle bumper structure that detects a collision with an object such as a pedestrian or the like.

2. Background of the Invention

Japanese Patent Application Publication No. 2000-225907 (JP-A-2000-225907) describes an arrangement in which a load sensor that detects a frontal collision of a vehicle with an object, e.g., a pedestrian is provided. Specifically, a groove extending in the vehicle width direction is formed in a front surface of the front-bumper reinforcement, and an elongated load sensor is placed in the groove, flush with the front surface. On the back surface of the front-bumper absorber, a pair of upper and lower grooves extending in the vehicle width direction are formed. A protruding portion (or a push portion) provided between the upper and the lower groove is disposed to correspond to the load sensor.

However, the vehicle bumper structure described in JP-A-2000-225907 leaves a room for improvement in the following aspects. Specifically, if the thickness of the front-bumper absorber (when viewed from above) differs from part to part or if the rigidity of the front-bumper reinforcement differs in the vehicle width direction, the characteristics of the load transferred to the front-bumper reinforcement through the front-bumper absorber will be different at the time of front collision with an object. In this case, the sensitivity (output) of the load sensor provided between the front-bumper absorber and the front-bumper reinforcement to sense the load imparted thereto in the vehicle longitudinal direction will vary depending on the region of impact, which makes it difficult to accurately sense a collision.

SUMMARY OF THE INVENTION

The present invention provides a vehicle bumper structure that decreases variations in the output of a load sensor.

In accordance with a first aspect of the present invention, a vehicle bumper structure is provided that includes: a bumper cover arranged at an outermost side of the vehicle and extending in a vehicle width direction; a bumper reinforcing member disposed spaced apart from the bumper cover toward the inside of the vehicle, the bumper reinforcing member extending in the vehicle width direction; a load sensing unit that senses an impact load, arranged on an outside or inside surface of the bumper reinforcing member in a vehicle longitudinal direction; and a bumper shock-absorbing member arranged between the bumper cover and the bumper reinforcing member and extending in the vehicle width direction, wherein the bumper shock-absorbing member has a bumper center region and bumper corner regions, which are different in at least one of a cross-sectional shape, a cross-sectional structure and a hardness from each other, to reduce variations in an output of the load sensing unit in the vehicle width direction.

In general, the curvature of the bumper cover often differs from that of the bumper reinforcing member, so that the bumper shock-absorbing member arranged between the bumper cover and the bumper reinforcing member has different thickness in the vehicle width direction. Usually, the bumper shock-absorbing member has an increased thickness at the bumper center region and a reduced thickness at the bumper corner regions. Furthermore, the rigidity of the bumper-reinforcing member differs in the vehicle width direction. Thus, due to the difference in the thickness of the bumper shock-absorbing member, the characteristics of the load transferred to the bumper-reinforcing member through the bumper shock-absorbing member at the time of collision varies in the vehicle width direction and the output of the load sensing unit varies depending on the positions of collision. This makes it difficult to precisely sense the occurrence of collision.

In accordance with the present invention, however, because the bumper shock-absorbing member the bumper shock-absorbing member has the bumper center region and the bumper corner regions which are different in at least one of a cross-sectional shape, a cross-sectional structure and a hardness from each other, so as to reduce variations in an output of the load sensing unit in the vehicle width direction, it is possible to accurately determine an collision with an object.

In the present invention, the bumper shock-absorbing member may be formed in a plural layer structure including two kinds of relatively soft and relatively hard layers, the hard layer being thicker at the bumper center region in the vehicle width direction and being thinner or disappearing at the bumper corner regions so as to reduce the difference in thickness of the soft layer over the entire extent thereof in the vehicle width direction.

With such configurations, because the relatively hard layer has an increased spring constant and therefore transfers the load to the load sensing unit with little absorption of shock energy. On the other hand, the relatively soft layer has a reduced spring constant and therefore absorbs the load by self-deformation, after which the load is transferred to the load-sensing unit.

The present invention takes advantage of such difference in properties. Thus, the relatively hard layer is thicker at the bumper center region in the vehicle width direction and is thinner or disappearing at the bumper corner regions so as to reduce difference in the thickness of the soft layer over an entire extent in the vehicle width direction. Accordingly, it is possible to accommodate the difference in the thickness of the bumper shock-absorbing member in the vehicle width direction by changing the hard layer. In other words, this provides an effect that the characteristic of a thicker absorber is matched for the characteristic of a thinner absorber. Thus, regardless of the collision positions in the vehicle width direction, the load is transferred to the load-sensing unit through the relatively soft layer of a substantially uniform width. This ensures that variations in the output of the load-sensing unit are minimized.

In the present invention, the hard layer may be arranged at the inner side and the soft layer may be arranged at the outer side in the vehicle longitudinal direction.

With such configurations, the hard layer makes direct contact with the load-sensing unit, thereby assuring direct transfer of load.

Alternatively, the hard layer may be arranged at the outer side and the soft layer may be arranged at the inner side in the vehicle longitudinal direction.

In this way, an appropriate level of rigidity is secured even when a vehicle user rests against the bumper cover.

In the present invention, the hard layer may have an irregularity portion on its surface facing the load-sensing unit.

With such configurations, the contact area of the hard layer with the load sensing unit becomes smaller than in a case where the irregularity portion is not formed, which makes it possible to increase the surface pressure of the contact surface in proportion thereto.

Alternatively, the hard layer may have an irregularity portion on its surface facing the soft layer.

In this case, the load input through the ridges to the soft layer is increased pinpointedly. This means that the load is transferred to the collision detection unit more effectively than in a case where the irregularity portion is absent.

In the present invention, the irregularity portion may have a greater protrusion length in the vehicle longitudinal direction at the bumper center region than at the bumper corner regions.

With such configurations, the ridges are pressed deep into the load-sensing unit at the bumper center region but slightly into the load-sensing unit at the bumper corner regions. Thus, the sensing performance of the load-sensing unit is relatively increased at the bumper center region and relatively decreased at the bumper corner regions.

In the present invention, the irregularity portion may have a smaller ridge-to-ridge pitch at the bumper center region than at the bumper corner regions.

With such configurations, the density of the load input points is increased (namely, the distribution of the ridges is denser) at the bumper center region but the density of the load input points is decreased (namely, the distribution of the ridges is sparser) at the bumper corner regions. Accordingly, the sensing performance of the load-sensing unit is relatively increased at the bumper center region and relatively decreased at the bumper corner regions.

In the present invention, the load-sensing unit may have a vertical width smaller than a vertical width of the bumper reinforcing member, the bumper shock-absorbing member having a cross-sectional shape set in such a manner that the load transferred to the bumper reinforcing member is relatively reduced at the bumper center region but increased at the bumper corner regions.

With such configurations, it is possible to reduce the overall bumper size. In this case, because the bumper shock-absorbing member is designed in such a manner that the load transferred to the bumper reinforcing member is reduced at the bumper center region but increased at the bumper corner regions, the load dispersion (relief) by which the input load is dispersed to the bumper reinforcing member becomes smaller at the bumper center region but greater at the bumper corner regions. Thus, it is possible to enhance the output (sensitivity) of the load-sensing unit at the bumper center region and to decrease the output (sensitivity) of the load-sensing unit at the bumper corner regions.

In the present invention, the cross-sectional shape of the bumper shock-absorbing member may be set in such a manner that a vertical width of the direct contact area with the bumper-reinforcing member is relatively smaller at the bumper center region but greater at the bumper corner regions.

With such configurations, the load that is dispersed from the bumper shock-absorbing member to the bumper-reinforcing member is reduced at the bumper center region but increased at the bumper corner regions. Moreover, the cross-sectional shape of the bumper shock-absorbing member is easily changed in the present invention, which makes it possible to manufacture the vehicle bumper structure with ease.

In the present invention, the load-sensing unit may be offset to an upper portion of the bumper-reinforcing member.

In this way, it becomes easy to sense the occurrence of collision with an object such as a pedestrian or the like. In other words, because the center of gravity of a pedestrian lies at a higher level than the front-bumper absorber, when a vehicle collides with a pedestrian, the pedestrian generally falls toward the top portion of the front bumper on his or her legs. Accordingly, the load can be easily sensed if the load-sensing unit is arranged offset to the upper portion of the bumper reinforcing member.

In the present invention, the bumper shock-absorbing member may include a first load transfer part for transferring the load to the load-sensing unit, the first load transfer part facing the load-sensing unit and having a relatively greater vertical width at the bumper center region, and a second load transfer part for transferring the load to the bumper-reinforcing member, the second load transfer part inclined down towards the bumper-reinforcing member from the first load transfer part with a gap interposed therebetween, the second load transfer part having a relatively smaller vertical width at the bumper center region, a leading end of the second load transfer part being released from the bumper-reinforcing member at the time of collision.

With such configurations, although the bumper shock-absorbing member is thick at the bumper center region when viewed from above, it is possible to increase the transfer efficiency of the load from the first load transfer part to the load-sensing unit.

Alternatively, the bumper shock-absorbing member may include a load transfer part for transferring the load to the load sensing unit, the load transfer part facing the load-sensing unit and having a relatively greater vertical width at the bumper center region, and an extension part extending toward the bumper reinforcing member from the load transfer part with a gap interposed therebetween, the extension part having a relatively smaller vertical width at the bumper center region and a length enough to prevent a leading end thereof from contacting with the bumper reinforcing member at the time of collision.

With such configurations, it is possible to further increase the transfer efficiency of the load from the load transfer part to the load-sensing unit.

In the present invention, the load transfer part for transferring the load to the load-sensing unit may be formed in a plural layer structure including two kinds of soft and hard layers, the hard layer being arranged at the inner side and the soft layer being arranged at the outer side in the vehicle longitudinal direction.

With such configuration, there are simultaneously provided both the effect of enhancing the load transfer efficiency from the load transfer part to the load-sensing unit and the effect of matching a thicker absorber and a thinner absorber in their characteristics.

In the present invention, the bumper shock-absorbing member may have an irregularity portion formed only at a bumper central portion of a surface of the bumper shock-absorbing member facing the load-sensing unit.

In general, the load is apt to be dispersed at the bumper center region where the bumper shock-absorbing member has an increased thickness. Thus, in the present invention, by forming the irregularity portion only at the center region of the surface of the bumper shock-absorbing member facing the load-sensing unit, the performance of load transfer to the load-sensing unit at the bumper center region is increased.

In the present invention, the bumper shock-absorbing member may have different foaming ratios at the bumper center region and at the bumper corner regions, the foaming ratio at the bumper center region being smaller than that at the bumper corner regions.

With such configurations, the bumper shock-absorbing member becomes harder at the bumper center region and softer at the bumper corner regions. Thus, the load that is transferred to the load-sensing unit is increase a at the bumper center region and decreased at the bumper corner regions.

In accordance with a second aspect of the present invention provides a vehicle bumper structure including: a bumper cover arranged at an outermost side of a vehicle and extending in a vehicle width direction; a bumper reinforcing member disposed spaced apart from the bumper cover toward the inside of the vehicle, the bumper reinforcing member extending in the vehicle width direction; a load-sensing unit for sensing an impact load, the load-sensing unit arranged on an outside or inside surface of the bumper reinforcing member in a vehicle longitudinal direction; a bumper shock-absorbing member arranged between the bumper cover and the bumper reinforcing member and extending in the vehicle width direction; and a load transfer member arranged between the bumper shock-absorbing member and the bumper reinforcing member or between the bumper cover and the bumper shock-absorbing member, the load transfer member being harder than the bumper shock-absorbing member, the load transfer member being thicker at the bumper center region in the vehicle width direction and being thinner or disappearing at the bumper corner regions so as to reduce variations in an output of the load-sensing unit in the vehicle width direction.

In general, it is often the case that the curvature of the bumper cover differs from that of the bumper reinforcing member, for the reason of which the bumper shock-absorbing member arranged between the bumper cover and the bumper reinforcing member has different thickness in the vehicle width direction. Usually, the bumper shock-absorbing member has an increased thickness at the bumper center region and a reduced thickness at the bumper corner regions. Furthermore, the rigidity of the bumper-reinforcing member differs in the vehicle width direction. Thus, due to the difference in the thickness of the bumper shock-absorbing member, the characteristics of the load transferred to the bumper reinforcing member through the bumper shock-absorbing member at the time of collision varies in the vehicle width direction and the output of the load-sensing unit varies depending on the positions of collision. This makes it difficult to precisely sense the occurrence of collision.

In accordance with the present invention, however, because the bumper shock-absorbing member extends in the vehicle width direction and further that the load transfer member is arranged between the bumper shock-absorbing member and the bumper reinforcing member or between the bumper cover and the bumper reinforcing member, the load transfer member being formed harder than the bumper shock-absorbing member and being thicker at the bumper center region and being thinner or disappearing at the bumper corner regions, it is possible to generally uniformly input an impact load to the load-sensing unit at the time of collision. This reduces variations in the output of the load-sensing unit.

In the present invention, the load-sensing unit may also be arranged on the outside surface of the bumper reinforcing member and extends in a lengthwise direction of the bumper reinforcing member.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Figure 1:
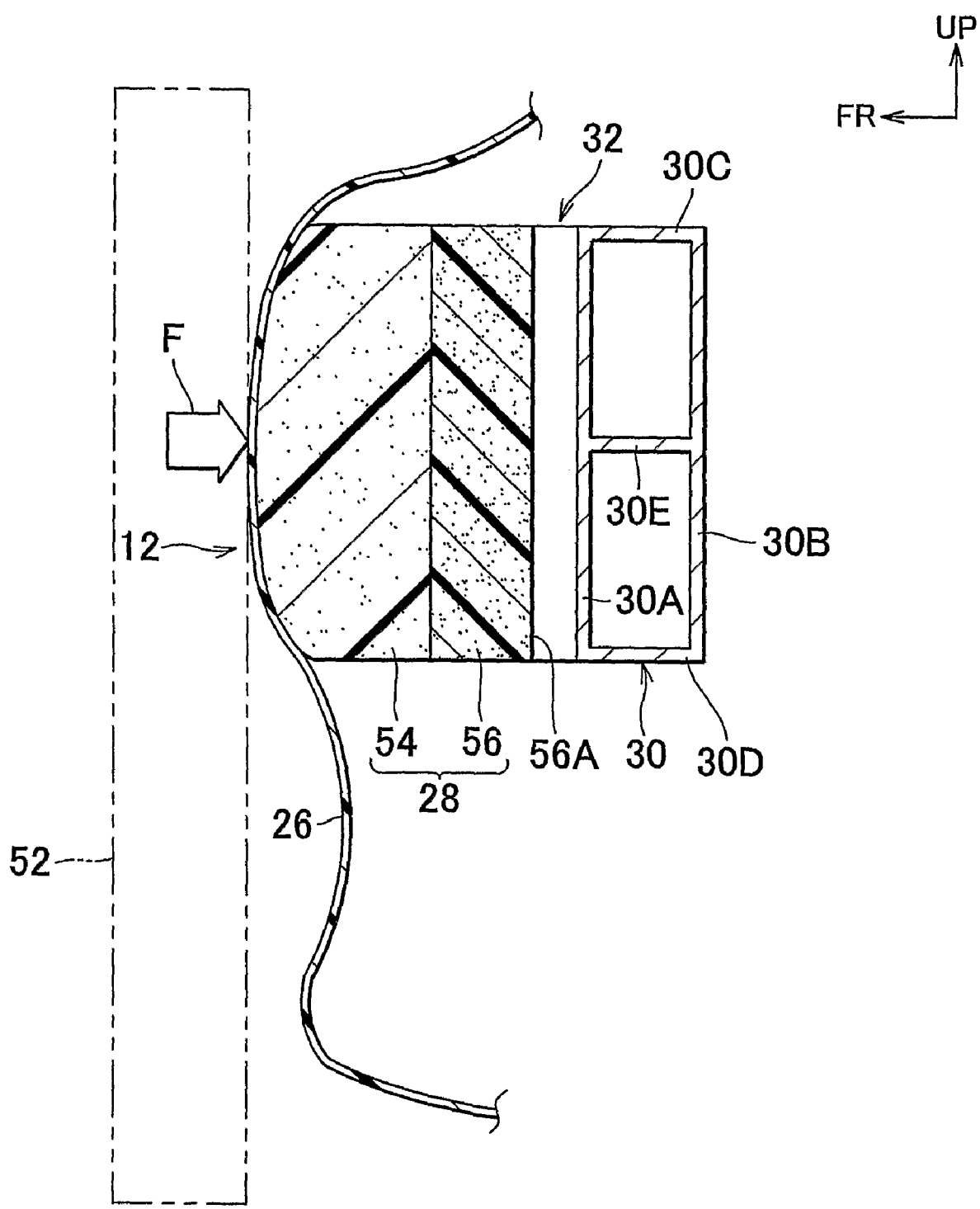
FIG. 1 is a vertical sectional view (an enlarged sectional view taken along line 1-1 in FIG. 3) showing major parts of a vehicle bumper structure in accordance with a first embodiment of the present invention.

Hereinafter, there will be described a vehicle bumper structure in accordance with a first embodiment of the present invention with reference to FIGS. 1 to 6. In the drawings, the arrow FR represents a vehicle front direction, the arrow UP denotes a vehicle upward direction, and the arrow IN stands for a vehicle inward width direction.

Figure 2:
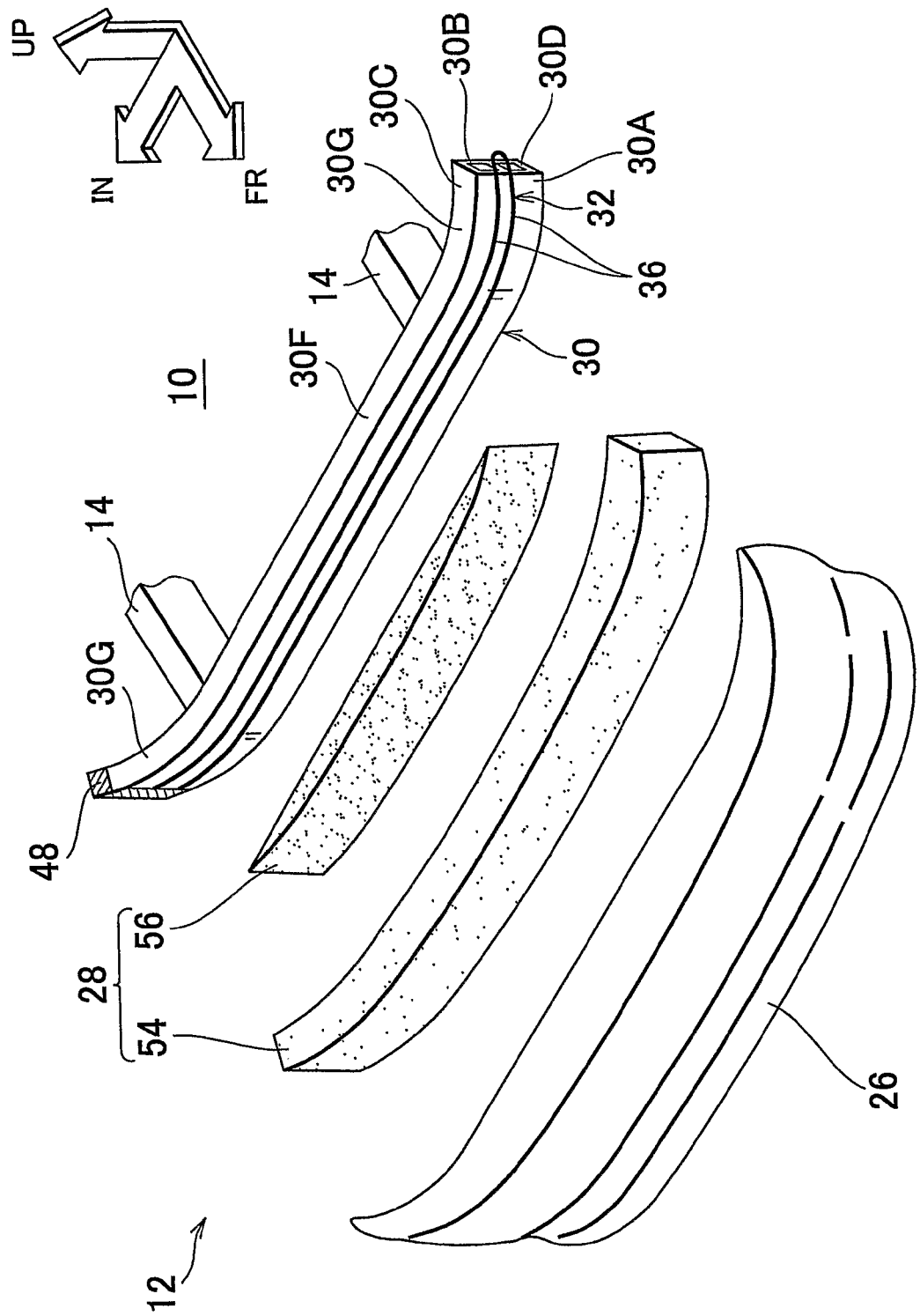
FIG. 2 is an exploded perspective view illustrating a front bumper of a front vehicle-body section including the vehicle bumper structure shown in FIG. 1.
Figure 3:
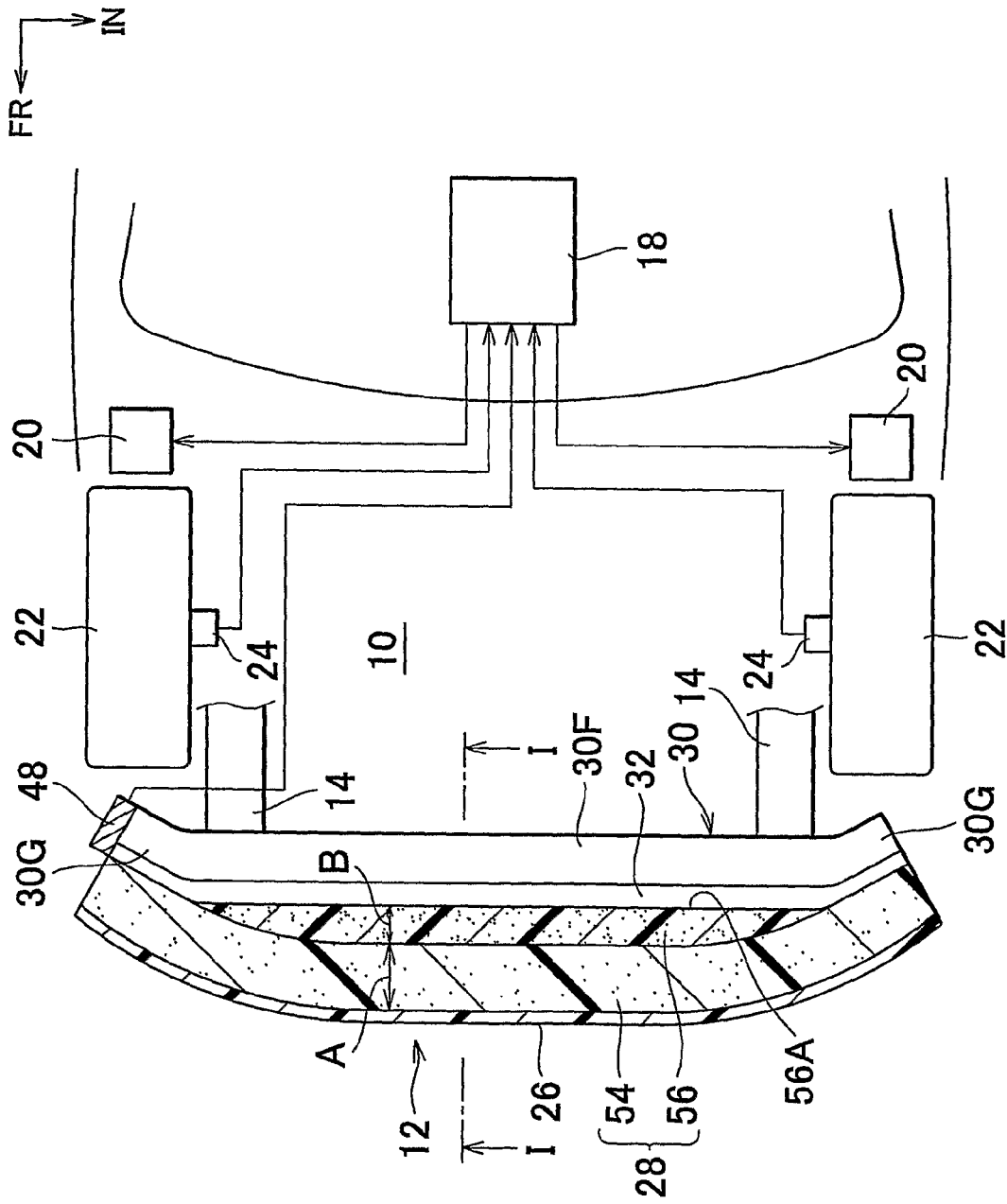
FIG. 3 is a horizontal sectional view depicting the front vehicle-body section including the vehicle bumper structure shown in FIG. 1.

FIG. 3 is a schematic top view of a front vehicle-body section 10; FIG. 2 is an exploded perspective view of a front-bumper 12 in the front vehicle-body section 10; and FIG. 1 is a vertical sectional view (an enlarged sectional view taken along the line 1-1 in FIG. 3) showing major parts of a vehicle bumper structure in accordance with the first embodiment of the present invention.

As shown in FIGS. 1 to 3, a pair of left and right front side members 14 is arranged on both lateral sides of the front vehicle-body section 10 to extend in a longitudinal direction of a vehicle. The front side members 14 are jointed at their front ends to a front end portion of the front vehicle-body section 10 at both lateral side portions of the front bumper 12 which extends in a vehicle width direction.

Further, an impact detection circuit 48, which will be described later, is arranged at one longitudinal end of the front bumper 12. The impact detection circuit 48 is connected to a central control unit (control means) 18 disposed, e.g., under a center console box (not shown). The central control unit 18 is associated with a pedestrian protection device such as a hood airbag device, an active hood device or the like, and controls the operation thereof. Moreover, vehicle speed sensors 24 are arranged on the inner sides of respective front wheels 22 in the vehicle width direction and are also connected to the central control unit 18.

Meanwhile, the front bumper 12 includes a front bumper cover 26 disposed at the frontmost end of the front vehicle-body section 10 and extending in the vehicle width direction to form a vehicle design surface, a front-bumper absorber 28, as a bumper shock-absorbing member, arranged on a vehicle-rear side of the front bumper cover 26 and extending in the vehicle width direction along the front bumper cover 26, and a front-bumper reinforcement 30, as a bumper reinforcing member, arranged on a vehicle-rear side of the front-bumper absorber 28 and extending in the vehicle width direction.

The front-bumper reinforcement 30 has a vertical cross section of "日" shape (i.e., a hollow dual-compartment block shape) when taken in the vehicle longitudinal direction and is formed of a high rigidity member with a front wall portion 30A, a rear wall portion 30B, a top wall portion 30C, a bottom wall portion 30D and an intermediate wall portion 30E. As mentioned above, the left and right front side members 14 are respectively jointed at their front ends to the rear wall portion 30B of the front-bumper reinforcement 30 either directly or through an energy-absorbing member such as a crush box or the like. The front-bumper reinforcement 30 has longitudinal opposite end portions curved toward a vehicle-rear side at a predetermined angle.

The front-bumper absorber 28 is made of a foam material, e.g., urethane foam, having a predetermined hardness. In the event of collision with an object 52 (see FIG. 1), the front-bumper absorber 28 is compressively deformed in the vehicle longitudinal direction to absorb a predetermined amount of impact energy. In this embodiment, the front-bumper absorber 28 has a vertical cross section of a generally rectangular shape.

An elongated optical fiber sensor 32 serving as a load-sensing unit is arranged on an upper portion of the front surface of the front wall portion 30A of the front-bumper reinforcement 30.

Figure 4:
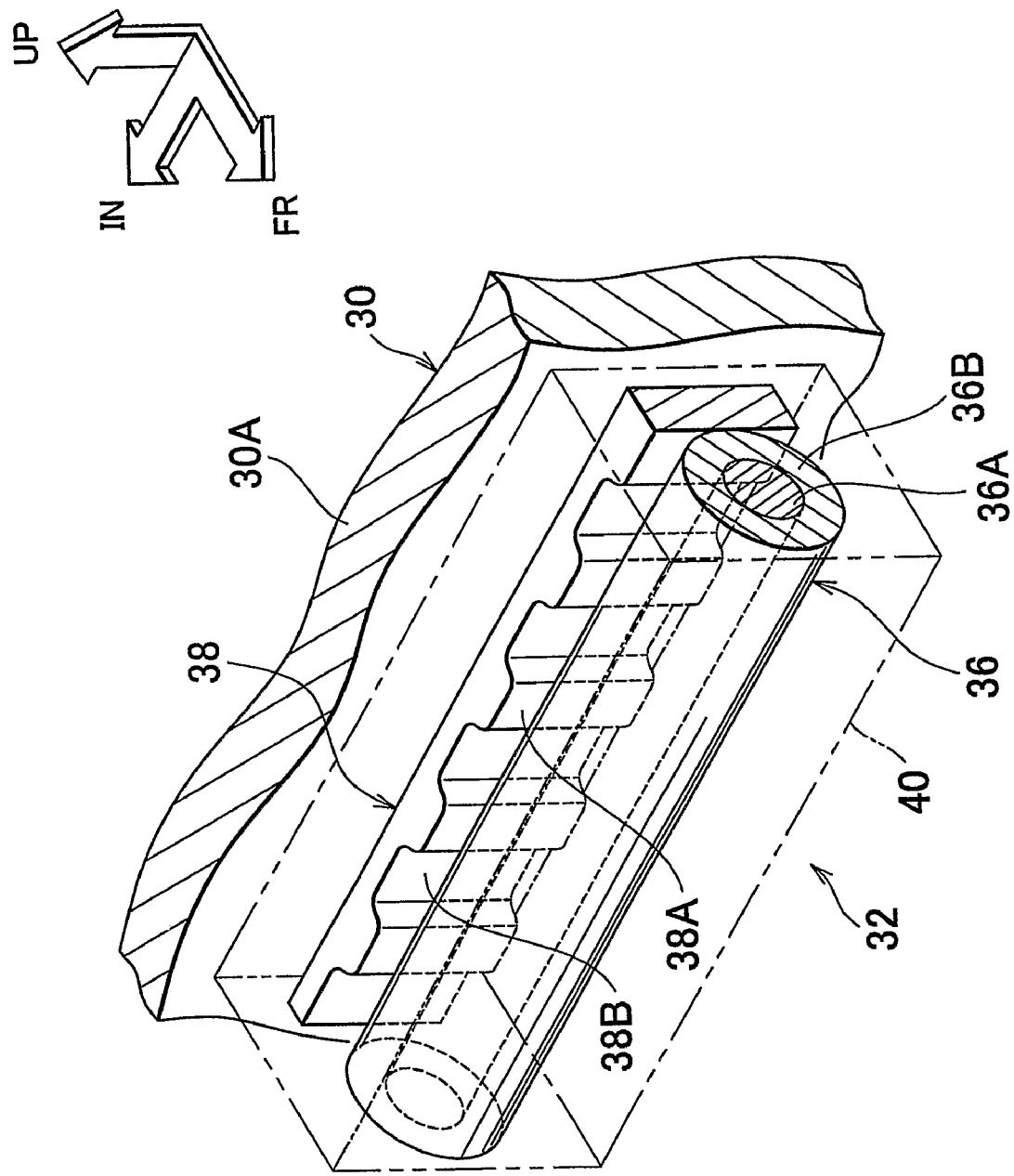
FIG. 4 is a partially cutaway, enlarged perspective view illustrating an optical fiber sensor shown in FIG. 1.

As illustrated in FIG. 4, the optical fiber sensor 32 includes an optical fiber 36 having a core 36A of a circular cross-section and a clad layer 36B coated on the core 36A, an impact detection circuit 48 (see FIGS. 3 and 5).to which a terminal end of the optical fiber 36 is connected, a band-like support member 38 arranged in direct contact with a rear surface of the optical fiber 36, and a resin member 40 of a rectangular cross-section in which the optical fiber 36 and the support member 38 are enclosed by insertion-molding. The rear-end surface of the resin member 40 makes contact with a front surface of the front wall portion 30A of the front-bumper reinforcement 30, and the resin member 40 is disposed such that its front-end surface is in contact with a rear surface of a hard absorber 56 which will be described later. The resin member 40 may be sub-assembled to the hard absorber 56 by previously bonding the front-end surface of the resin member 40 to the rear surface of the hard absorber 56 by means of, e.g., an adhesive agent. The support member 38 is formed in the shape of a band plate with ridge portions 38A and recess portions 38B alternately arranged. The optical fiber 36 is in contact with the front-end surfaces of the ridge portions 38A.

The optical fiber 36 of the optical fiber sensor 32 is folded to be arranged in two upper and lower extensions running along the front surface of the front wall portion 30A of the front-bumper reinforcement 30. In other words, the optical fiber 36 of the optical fiber sensor 32 is essentially comprised of a single flexible member and is arranged in such a manner that it makes a U-turn at one longitudinal end of the front-bumper reinforcement 30 and then terminates at the other longitudinal end of the front-bumper reinforcement 30.

Figure 5:
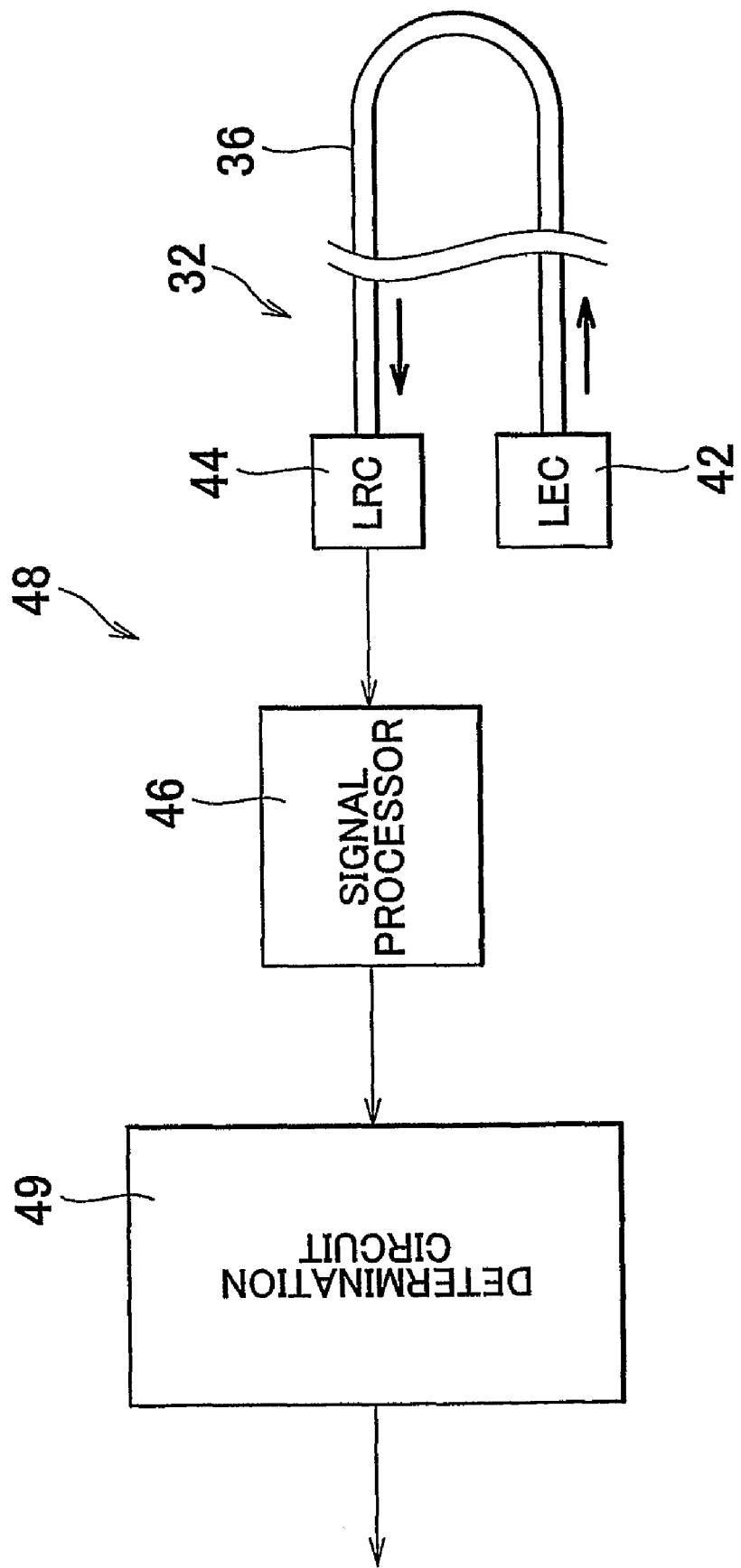
FIG. 5 is a schematic diagram showing an impact detection circuit.

As shown in FIG. 5, both ends of the optical fiber 36 are connected to a light-emitting circuit (LEC) 42 and a light-receiving circuit (LRC) 44 within the impact detection circuit 48, respectively. A light from the light-emitting circuit 42 is transmitted through the optical fiber 36 and then received by the light-receiving circuit 44, after which the light is photo-electrically converted to an electric signal corresponding to the intensity of the light. The electric signal output from the light-receiving circuit 44 is amplified and converted to a digital signal by a signal processor 46, and the digital signal is then output to a determination circuit 49. The determination circuit 49 compares the level of the signal input with a threshold value stored therein to determine whether collision with the object 52 (see FIG. 1) has occurred. The determination in the determination circuit 49 may be made in further detail to determine, e.g., whether the object 52 is a pedestrian or temporary fencing or cones in a construction site. The result of determination in the determination circuit 49 is output to the central control unit 18 set forth above. The control operation described above is only one example and, alternatively, the determination as to whether a collision with the object 52 has occurred may be made by the central control unit 18.

In this embodiment, the front-bumper reinforcement 30 is formed from an extruded aluminum alloy as illustrated in FIGS. 1 to 3. The front-bumper reinforcement 30 has a straight portion 30F rectilinearly extending along the vehicle width direction between the pair of left and right front side members 14, and longitudinally opposite curved end portions 30G bent at a predetermined angle toward the rear side of the vehicle.

In this embodiment, the front-bumper absorber 28 arranged between the front bumper cover 26 and the optical fiber sensor 32 is formed in a two-layer structure of a soft absorber 54 and the hard absorber 56. In other words, the front bumper cover 26 tends to have a curved shape when viewed from above in terms of vehicle design, while the front-bumper reinforcement 30 made of an extruded aluminum material is formed to have the straight portion 30F. For this reason, the front-bumper absorber 28 filled between the front bumper cover 26 and the front-bumper reinforcement 30 has a greater size (thickness) in the vehicle longitudinal direction at the central portion thereof in the vehicle width direction and a smaller size (thickness) at both side portions thereof. Provided that the front-bumper absorber 28 is formed of a single layer with a same hardness as in the conventional case, the optical fiber sensor 32 would show reduced sensitivity at the thicker portion but exhibit increased sensitivity at the thinner portions.

Taking this into account, the front-bumper absorber 28 of the present embodiment is formed in two layers of the soft absorber 54 arranged at the front side and the hard absorber 56 disposed at the rear side.

More specifically, the soft absorber 54 is arranged contiguous to the front bumper cover 26 and has a generally uniform thickness "A" (see FIG. 3) over the entire extent in the vehicle width direction. On the other hand, the hard absorber 56 is arranged between the rear surface of the soft absorber 54 and the front surface of the optical fiber sensor 32 in a range corresponding to the straight portion 30F of the front-bumper reinforcement 30. Therefore, the hard absorber 56 is not provided in the ranges corresponding to the curved portions 30G of the front-bumper reinforcement 30 and the soft absorber 54 is brought into direct contact with the optical fiber sensor 32.

Furthermore, the hard absorber 56 has a predetermined thickness "B" smaller than that of the soft absorber 54 at its central portion in the vehicle width direction and becomes gradually thinner as it goes outwardly in the vehicle width direction to disappear near the opposite ends of the straight portion 30F.

Turning to the matter of hardness, the hard absorber 56 has a foaming ratio of about five times but the soft absorber 54 has a foaming ratio of about 20 to 40 (preferably 30) times.

Next, description will be given to the operation and effect of the present embodiment.

If the front bumper 12 collides against the object 52, the impact load F (see FIG. 1) is first applied to the front bumper cover 26 lying on the outermost side of the vehicle. The impact load F applied to the front bumper cover 26 is transferred to and absorbed by the front-bumper absorber 28 arranged at the vehicle-rear side of the front bumper cover 26. Specifically, because the front-bumper absorber 28 is formed in two soft and hard layers, the impact load F is generally absorbed by the soft absorber 54 and then transferred through the hard absorber 56 to the optical fiber sensor 32. Thus, the optical fiber sensor 32 senses the collision of the front bumper 12 with the object 52.

In other words, if the resin member 40 of the optical fiber sensor 32 is pressed toward the front wall portion 30A of the front-bumper reinforcement 30, i.e., toward the vehicle-rear side, by means of the rear surface 56A of the hard absorber 56, the resin member 40 is compressively strained in the vehicle longitudinal direction to press the optical fiber 36 toward the vehicle-rear side. Because the ridge portions 38A of the support member 38 are arranged in contact with the vehicle-rear side of the optical fiber 36, the optical fiber 36 is flexurally deformed at its portions corresponding to the recess portions 38B between the ridge portions 38A, which leads to reduction in light transmission efficiency. The reduced level of transmitted light is sensed by the light-receiving circuit 44 and photoelectrically converted to an electric signal. The electric signal is amplified by the signal processor 46 and then input to the determination circuit 49. The determination circuit 49 compares the level of the signal that is input with a preset threshold value to determine whether a collision with the object 52 has occurred. The result of determination is output to the central control unit 18. Taking into account a signal received from the vehicle speed sensors 24 as well as the above determination result, the central control unit 18 actuates a pedestrian protection device 20 (such as a hood airbag device, an active hood device or the like).

Figure 6:
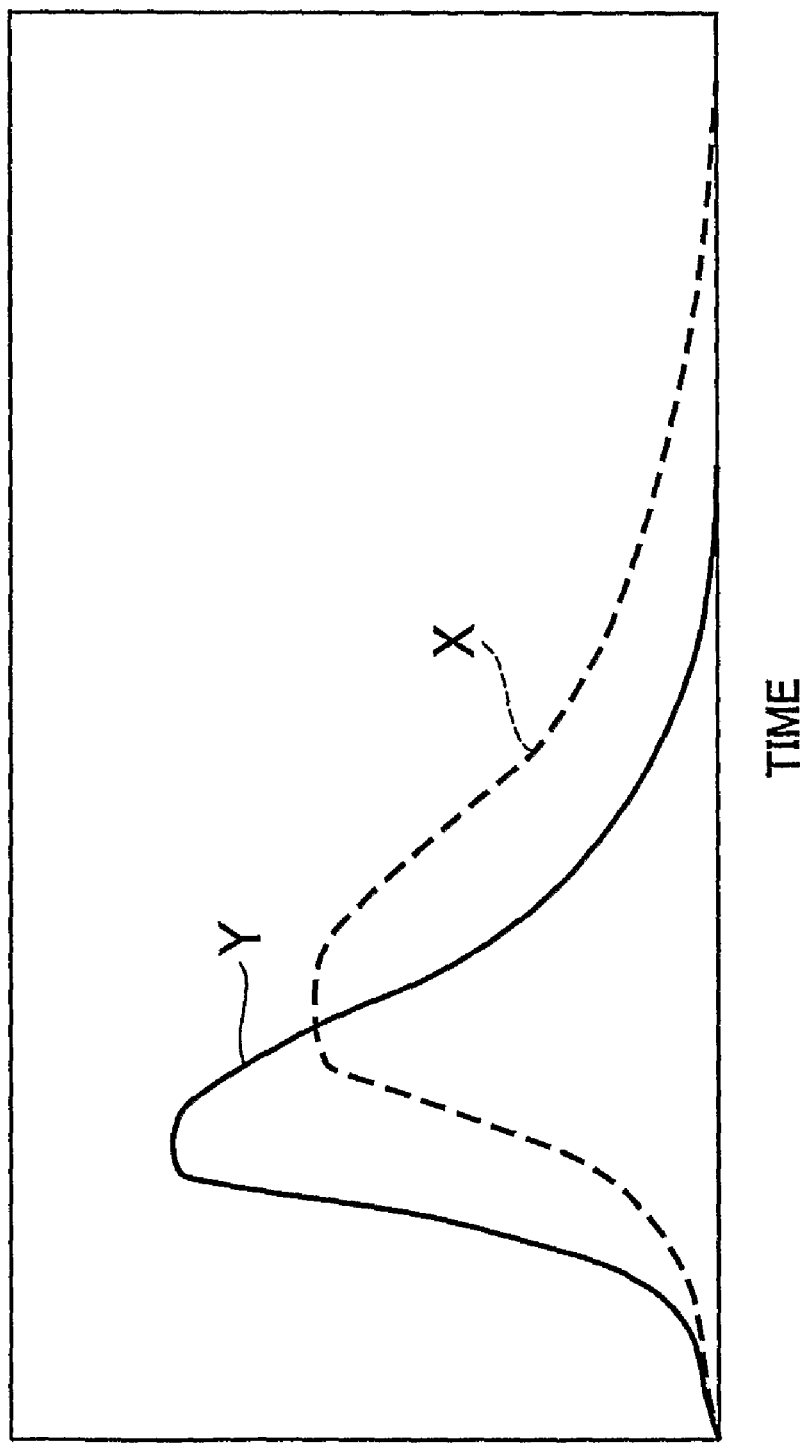
FIG. 6 is a graph for explaining the effect offered by the vehicle bumper structure of the first embodiment.

In a conventional vehicle bumper structure, the front-bumper absorber has a thickness varying in the vehicle width direction, increasing in thickness in the central portion but decreasing in thickness in the corner portions, which tends to incur variations in the output of the optical fiber sensor. In the present embodiment, however, the front-bumper absorber 28 is formed in a two-layer structure of the soft absorber 54 and the hard absorber 56, and the soft absorber 54 has a generally uniform thickness over the entire width of the front bumper 12. This ensures that the load input to the optical fiber sensor 32 through the hard absorber 56 is substantially uniform regardless of the collision position of the front bumper 12 with the object 52. That is, changing the thickness of the hard absorber 56 substantially compensates for the variations in thickness of the front-bumper absorber 28 in the vehicle width direction. In other words, as illustrated in FIG. 6, there is provided an effect that the characteristic "X" of a thicker absorber (showing a moderate load curve at the time of collision with a pedestrian) is matched for the characteristic "Y" of a thinner absorber (showing a precipitous load curve at the time of collision with a pedestrian). As a result, the present embodiment reduces variations in the output of the optical fiber sensor 32.

Particularly, if the soft absorber 54 is arranged at the vehicle-front side and the hard absorber 56 is placed at the vehicle-rear side, the optical fiber sensor 32 is directly pressed by the rear surface 56A of the hard absorber 56, thereby assuring direct load transfer. This allows the load to be input to the optical fiber sensor 32 in a facilitated manner.

Figure 7:
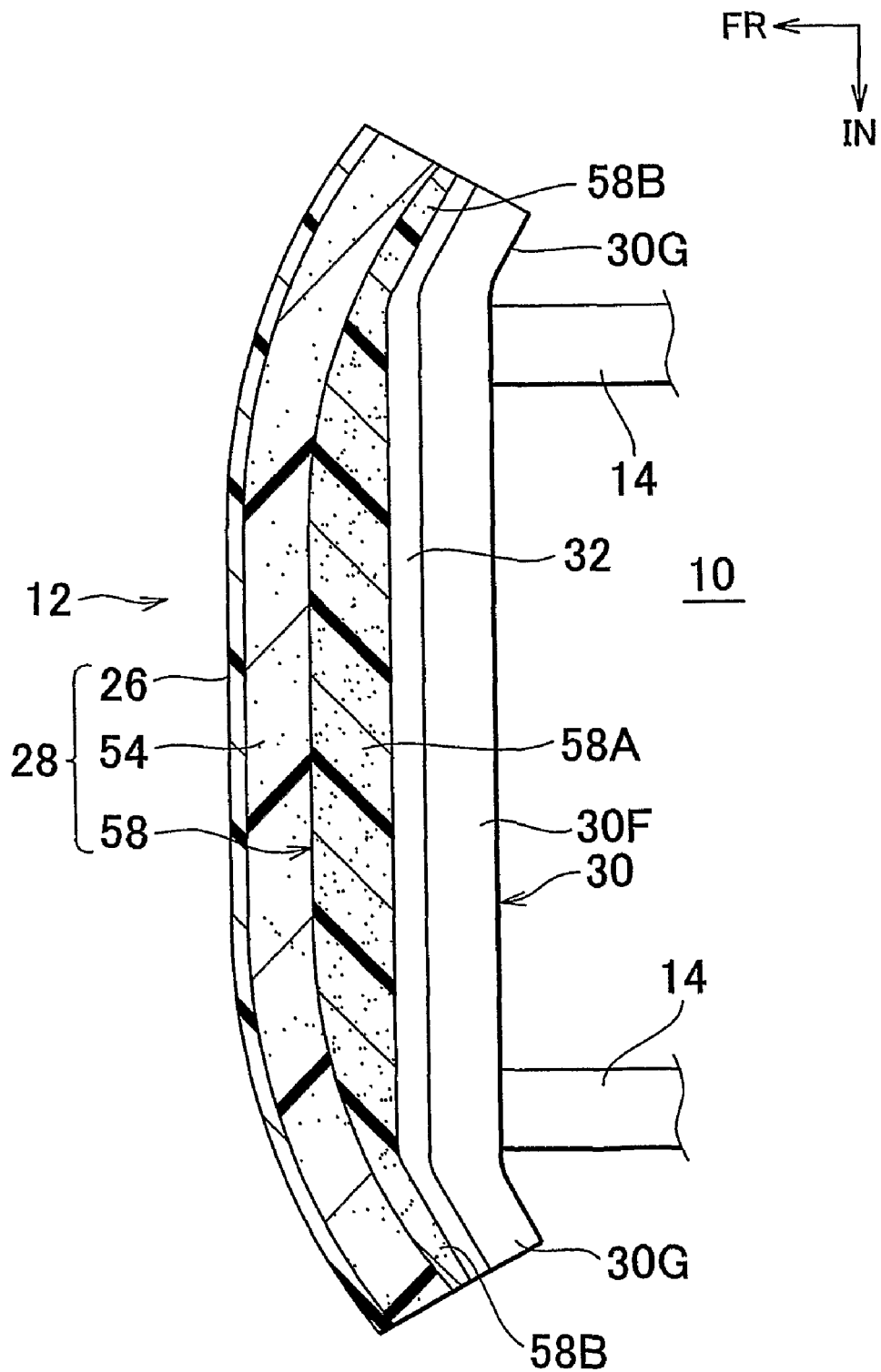
FIG. 7 is a horizontal sectional view, corresponding to FIG. 3, showing a first modified example of the first embodiment in which a hard absorber is formed over the entire extent in a bumper width direction.

In a modified example shown in FIG. 7, a hard absorber 58 extends over the entire extent of the front bumper 12 in the vehicle width direction. That is, the hard absorber 58 includes a central portion 58A lying between the optical fiber sensor 32 and the soft absorber 54 in a corresponding relationship with the straight portion 30F of the front-bumper reinforcement 30 and opposite end portions 58B disposed between the optical fiber sensor 32 and the soft absorber 54 in a corresponding relationship with the curved portions 30G.

In accordance with the above-described configuration, the thickness of the soft absorber 54 can be made uniform over the entire extent in the vehicle width direction in more precise manner by accurately taking the thickness of the opposite end portions 58B of the hard absorber 58.

Figure 8:
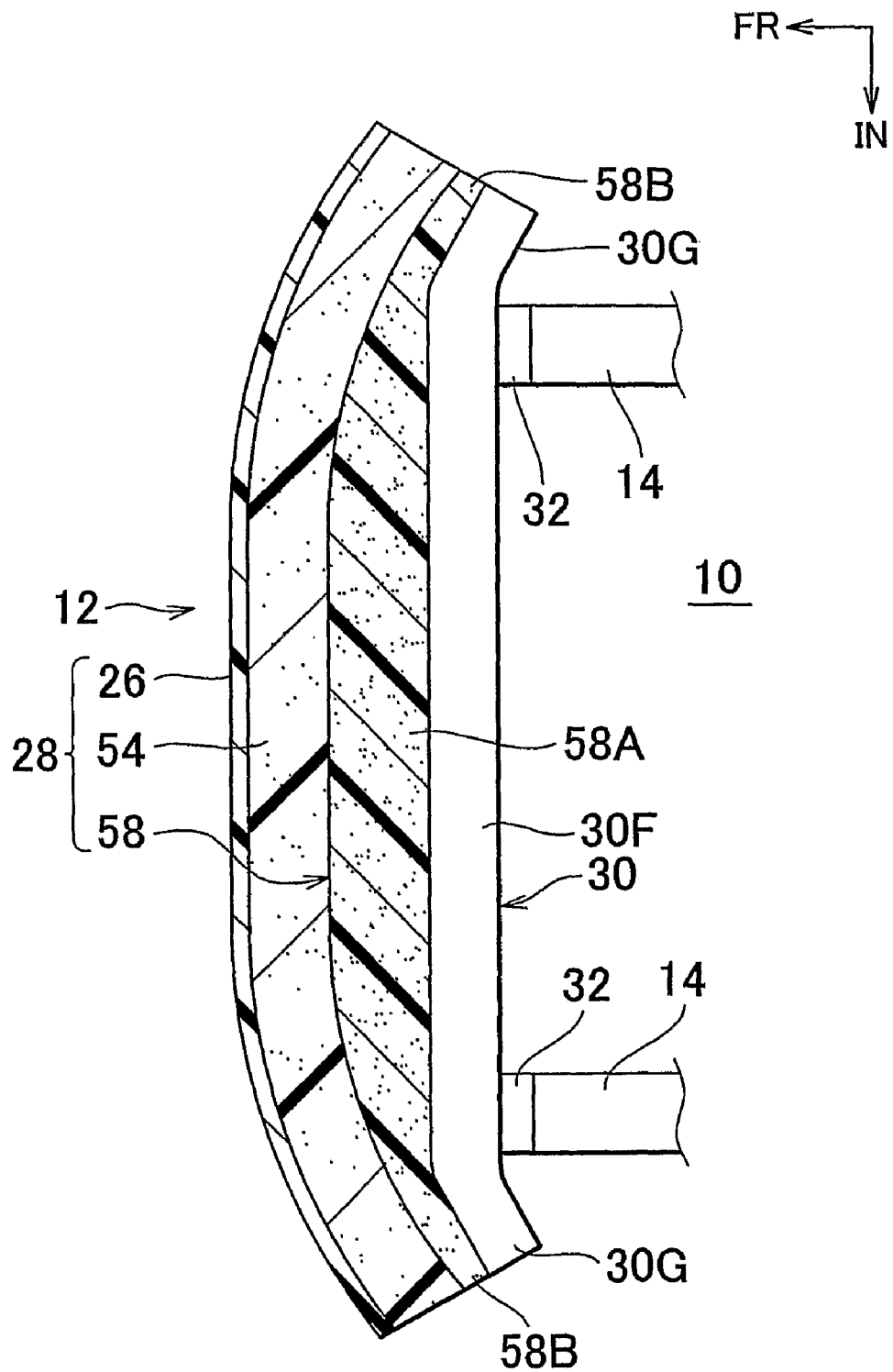
FIG. 8 is a horizontal sectional view, corresponding to FIG. 3, showing a second modified example of the first embodiment in which optical fiber sensors are arranged between a front-bumper reinforcement and the forefronts of front side members.

Another modified example shown in FIG. 8 has a feature different from the configuration illustrated in FIG. 7 in that the optical fiber sensors 32 are installed on the rear surface of the front-bumper reinforcement 30 not the front surface thereof. That is, in this modified example, the optical fiber sensors 32 are respectively arranged between the rear surface of the rear wall portion 30B of the front-bumper reinforcement 30 and the forefronts of the pair of left and right front side members 14.

In accordance with the configuration noted above, the optical fiber sensors 32 do not hinder the task of mounting the front bumper 12 on the front-bumper reinforcement 30, thereby improving the mountability of the front bumper 12.

Figure 9:
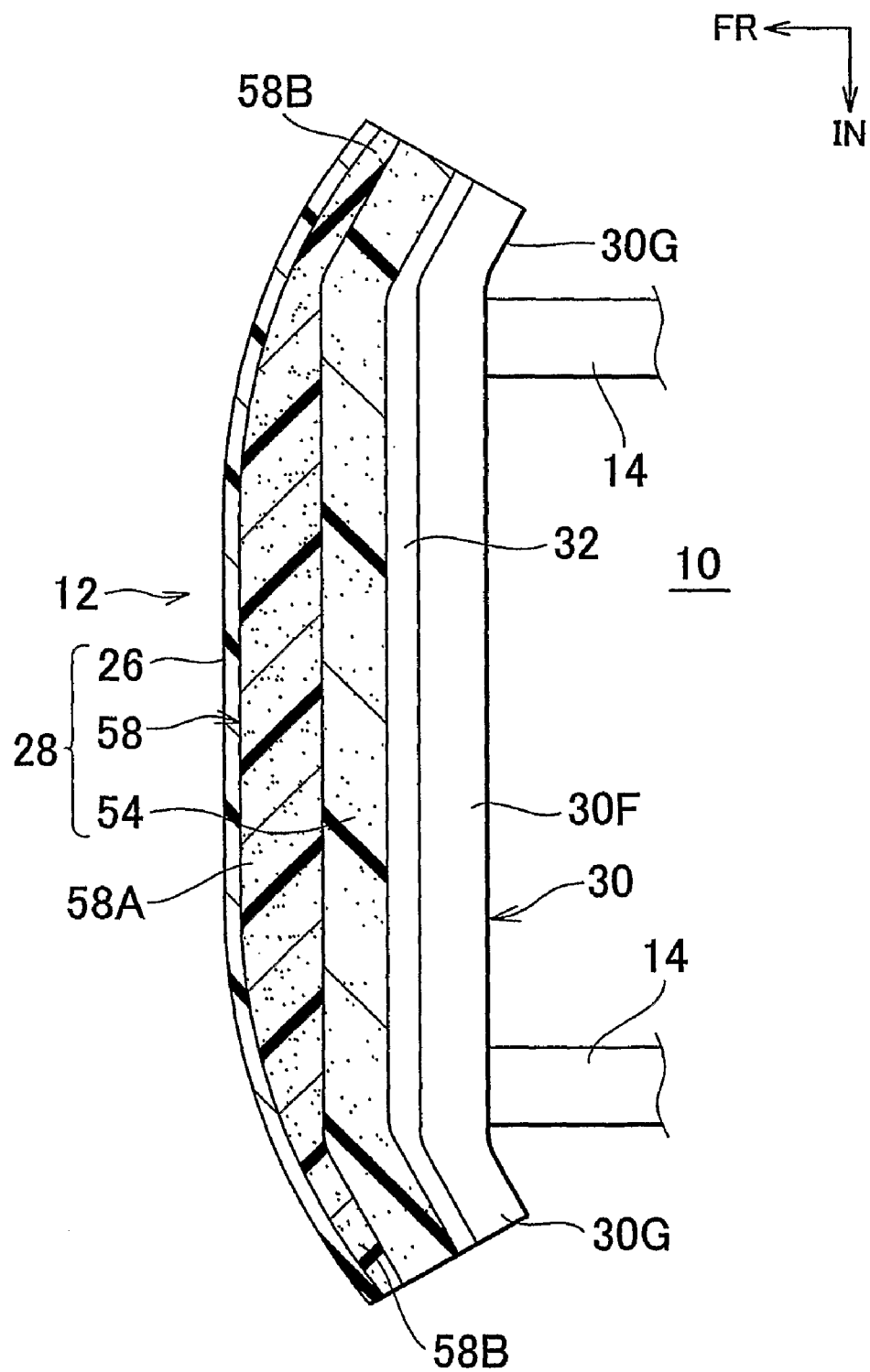
FIG. 9 is a horizontal sectional view, corresponding to FIG. 3, showing a third modified example of the first embodiment in which the positions of a soft absorber and a hard absorber are reversed in the vehicle longitudinal direction.

Still another modified example shown in FIG. 9 has a feature different from the configuration illustrated in FIG. 7 in that the positions of the hard absorber 58 and the soft absorber 54 are reversed.

In accordance with the configuration set forth above, the hard absorber 58 is disposed contiguous to the rear surface of the front bumper cover 26, thereby assuring an appropriate level of rigidity even when a vehicle user rests against the front bumper cover 26. This helps to remove the feeling that the front bumper cover 26 is warped when the vehicle user rests against the front bumper cover 26.

Next, a vehicle bumper structure in accordance with a second embodiment of the present invention will be described with reference to FIG. 10. The same parts or components as those of the afore-mentioned first embodiment will be designated by like reference numerals, and descriptions therefor will be omitted.

In the vehicle bumper structure of the second embodiment, an on-off sensor that turns on in response to the exertion of a surface pressure equal to or greater than a predetermined value is used as a collision detection sensor 60 arranged at the front surface of the front-bumper reinforcement 30.

By using an on-off sensor as the collision detection sensor 60, if the hard absorber 58 of the modified example of the first embodiment shown in FIG. 7 is put into use as it is, the flat rear surface of the hard absorber 58 presses the entirety of the collision detection sensor 60, which exerts less surface pressure on the collision detection sensor 60 compared with a case where an irregular rear surface of the hard absorber presses the collision detection sensor 60 under a same impact load. This leaves a possibility that the collision detection sensor 60 will not be turned on.

Thus, in the present embodiment, a hard absorber 64 provided on its rear surface with an irregularity portion 62 of a wave pattern when viewed from above is employed in place of the hard absorber 58 with the flat rear surface. The irregularity portion 62 is formed over the entire extent of the hard absorber 64 in the vehicle width direction. The surface pressure can be tuned by changing the shape and pitch of the irregularity portion 62.

Although the collision detection sensor 60 may be used independently, it is also possible to use the same in combination with the optical fiber sensor 32 described above in the first embodiment, in which case dual sensing system are established to thereby enhance the collision sensing reliability.

Ridges 62A of the irregularity portion 62 formed at the central region (straight region) 64A of the hard absorber 64 are set to have a protrusion length in the vehicle longitudinal direction greater than that of ridges 62A of the irregularity portion 62 formed at the opposite end regions (curved regions) 64B of the hard absorber 64. The irregularity portion 62 has a smaller pitch in the central region 64A of the hard absorber 64 than in the opposite end regions 64B.

Essentially, the operation of the second embodiment is the same as that of the first embodiment described above. Difference lies in that, when the impact load transferred from the front bumper cover 26 to the front-bumper absorber 28 is absorbed by the soft absorber 54 and then transferred through the hard absorber 64 to the collision detection sensor 60, the load that is input is concentrated on the collision detection sensor 60 through the ridges 62A of the irregularity portion 62 while no load is inputted through valleys 62B. This ensures that the surface pressure at the contact points of the collision detection sensor 60 with the ridges 62A is increased a level sufficient to reliably turn on the collision detection sensor 60 and to detect the occurrence of collision.

In this way, the vehicle bumper structure of the present embodiment has an ability to increase the surface pressure acting on the collision detection sensor 60 by the provision of the irregularity portion 62 on the rear surface of the hard absorber 64. This makes it possible to enhance the performance of load transfer from the front-bumper absorber 28 to the collision detection sensor 60.

In the present embodiment, thanks to the fact that the ridges 62A of the irregularity portion 62 formed at the central region 64A of the hard absorber 64 are set to have a protrusion length in the vehicle longitudinal direction greater than that of the ridges 62A of the irregularity portion 62 formed at the opposite end regions 64B of the hard absorber 64, the ridges 62A are pressed deep into the collision detection sensor 60 at the central portion but slightly into the collision detection sensor 60 at the side portions. Thus, the collision detection sensor 60 has a relatively high sensing performance at the central portion thereof and a relatively low sensing performance at the side portions. As a consequence, it is possible to reduce variations in the output of the collision detection sensor 60 by changing the protrusion length of the ridges 62A.

Moreover, in the present embodiment, because the irregularity portion 62 has a smaller pitch in the central region 64A of the hard absorber 64 than in the opposite end regions 64B, the density of the load input points is increased (namely, the distribution of the ridges 62A becomes dense) at the central portion of the collision detection sensor 60 but the density of the load input points is decreased (namely, the distribution of the ridges 62A becomes sparse) at the side portions of the collision detection sensor 60. Accordingly, the collision detection sensor 60 has a relatively sensitivity at the central portion thereof but a relatively sensitivity at the side portions. As a consequence, it is possible to reduce variations in the output of the collision detection sensor 60 by changing the pitch of the irregularity portion 62.

Figure 11:
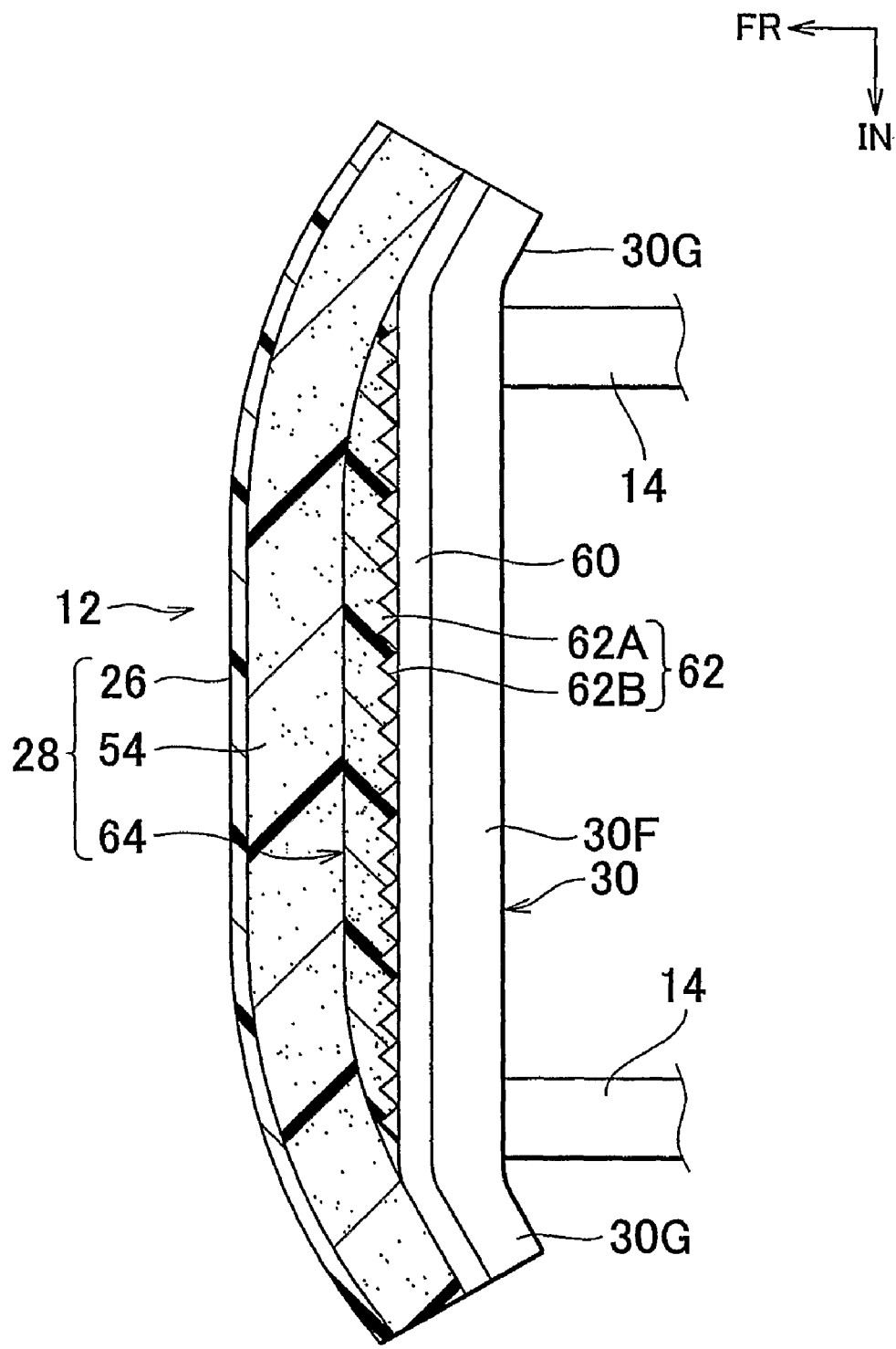
FIG. 11 is a horizontal sectional view, corresponding to FIG. 10, showing a first modified example of the second embodiment in which a hard absorber is arranged only at the bumper center region.

In a modified example of the second embodiment illustrated in FIG. 11, a hard absorber 66 is arranged only at an area corresponding to the central region of the bumper. Thus, the irregularity portion 62 is arranged to face the straight portion 30F of the front-bumper reinforcement 30 but the soft absorber 54 makes direct contact with the collision detection sensor 60 in the curved portions 30G of the front-bumper reinforcement 30.

Figure 10:
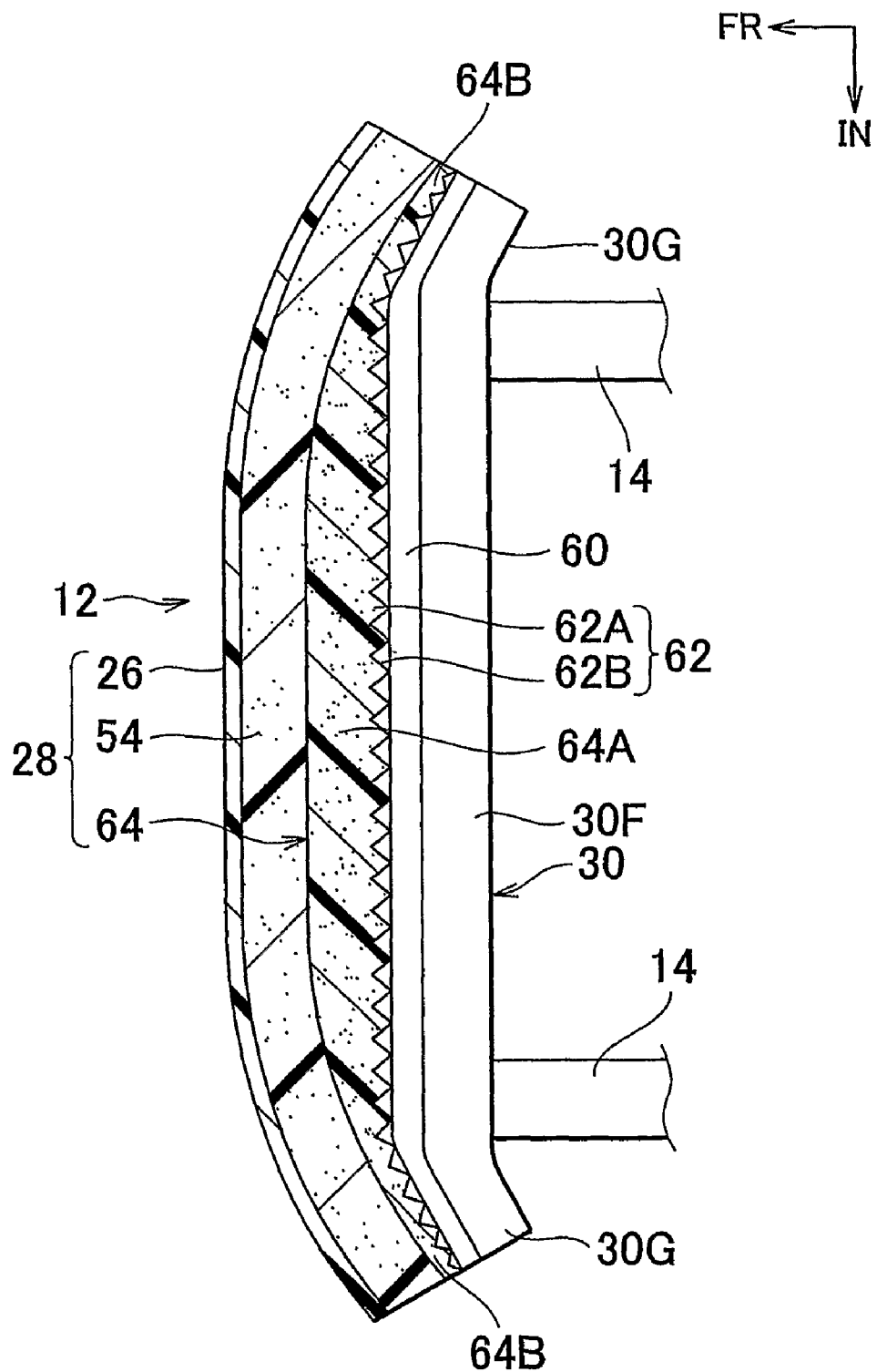
FIG. 10 is a horizontal sectional view, corresponding to FIG. 3, showing an enlarged view of the major parts of a vehicle bumper structure in accordance with a second embodiment of the present invention.

The configuration noted just above is capable of providing essentially the same operation and effect as that of the configuration shown in FIG. 10. Additionally, it is possible to make the front-bumper absorber 28 lightweight in proportion to the size reduction of the hard absorber 66 in the bumper width direction.

Figure 12:
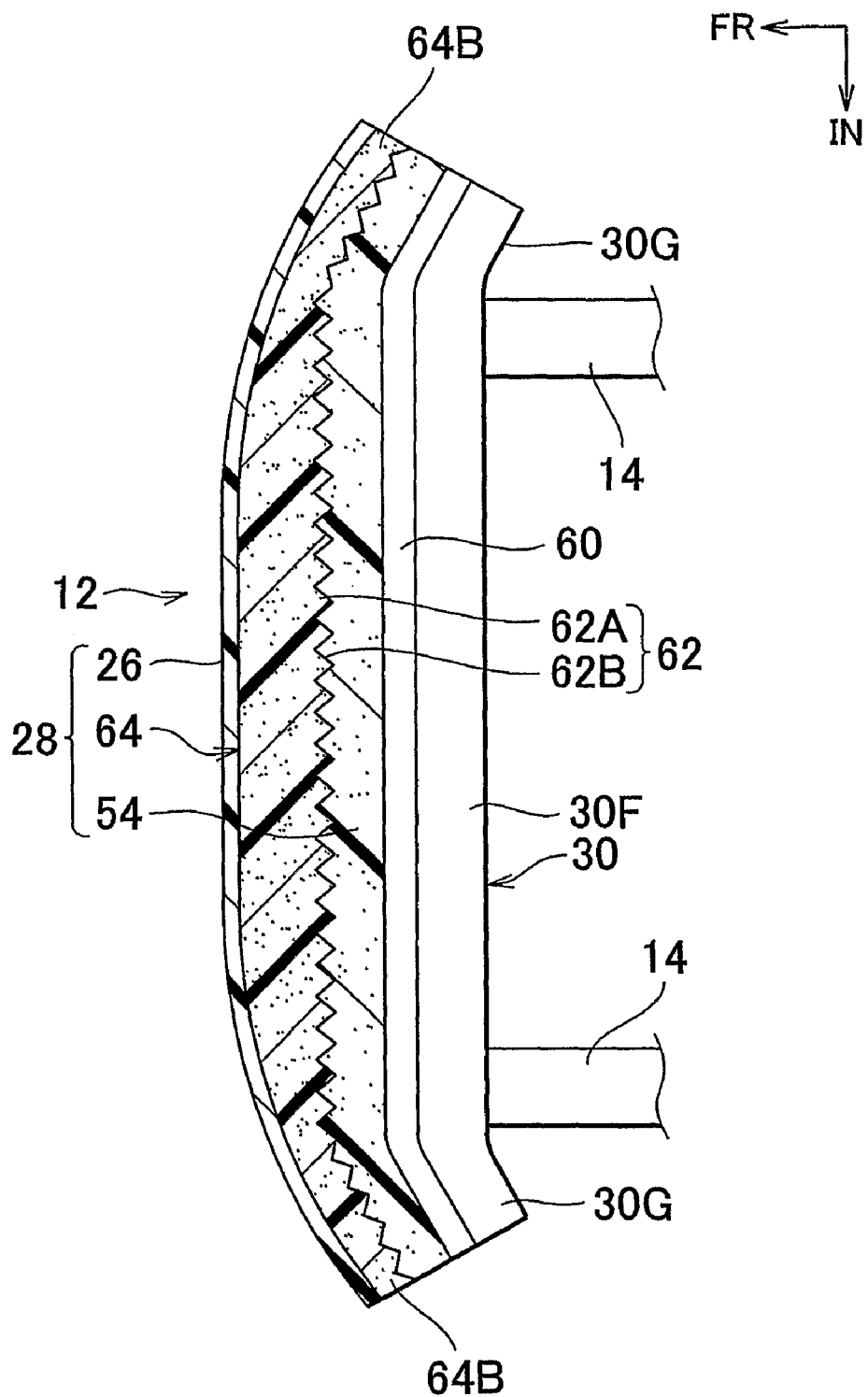
FIG. 12 is a horizontal sectional view, corresponding to FIG. 10, showing a second modified example of the second embodiment in which the positions of a soft absorber and a hard absorber are reversed in the vehicle longitudinal direction.

Another modified example of the second embodiment shown in FIG. 12 has a feature that the positions of the hard absorber 64 and the soft absorber 54 are reversed in the vehicle longitudinal direction.

With this configuration, the hard absorber 64 is disposed contiguous to the rear surface of the front bumper cover 26, thereby assuring an appropriate level of rigidity even when a vehicle user rests against the front bumper cover 26. This helps to remove the feeling that the front bumper cover 26 is warped when the vehicle user rests against the front bumper cover 26.

Moreover, because the irregularity portion 62 of the hard absorber 64 is formed on a confronting surface (contact surface) with the soft absorber 54, the load that is input through the ridges 62A to the soft absorber 54 is increased pinpointedly. This means that the load is transferred to the collision detection sensor 60 more effectively than in the case where the irregularity portion 62 is absent. Consequently, with the modified example noted above, it is possible to increase the performance of load transfer from the front-bumper absorber 28 to the collision detection sensor 60.

Hereinafter, a vehicle bumper structure in accordance with a third embodiment of the present invention will be described with reference to FIGS. 13 and 14. The same parts or components as those of the afore-mentioned first embodiment will be designated by like reference numerals, and descriptions therefor will be omitted.

Figure 13:
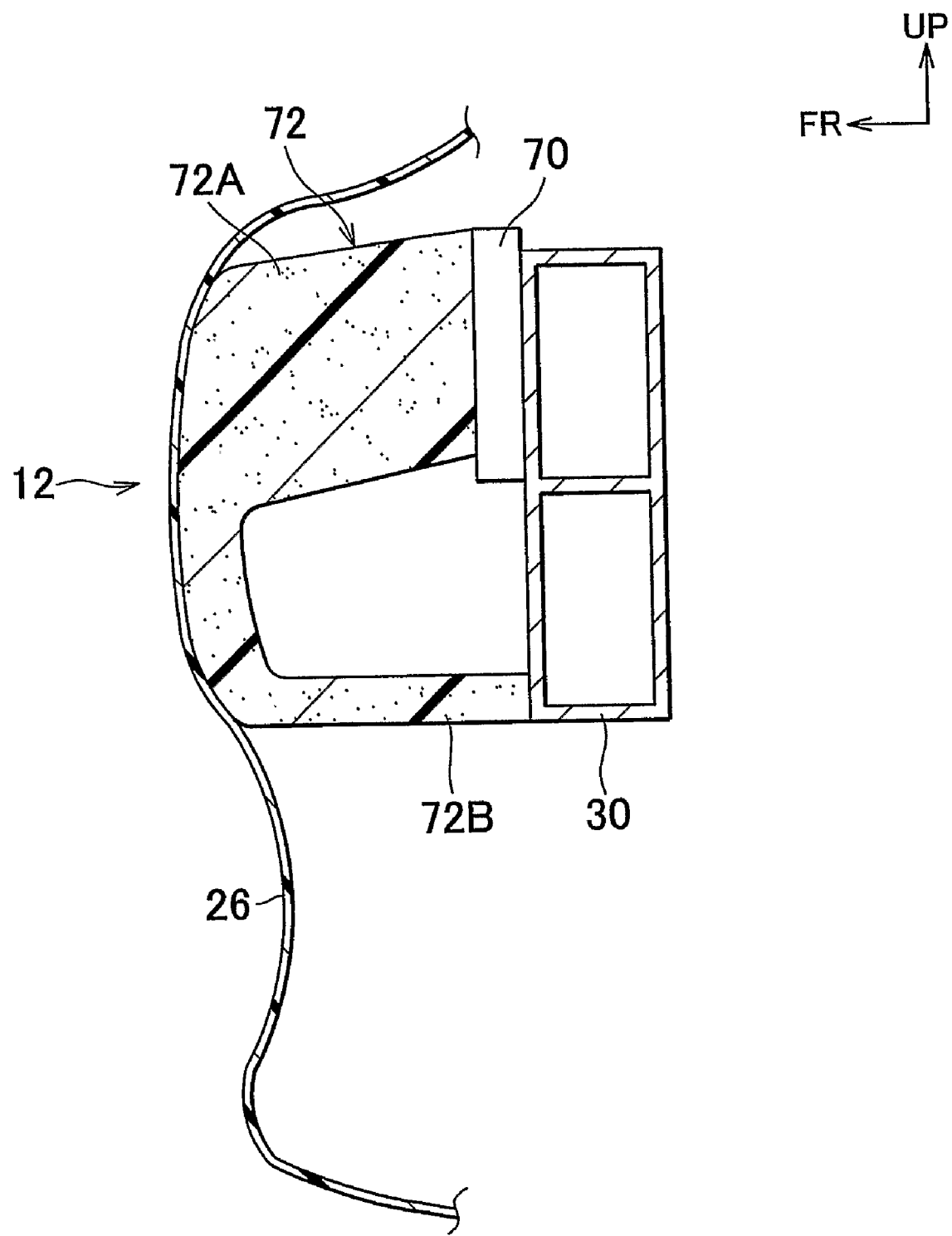
FIG. 13 is a partially enlarged vertical sectional view taken at the center of the vehicle, showing major parts of a vehicle bumper structure in accordance with a third embodiment of the present invention.

FIG. 13 is an enlarged vertical sectional view of the front bumper 12 taken at the center of the vehicle. FIG. 14 is an enlarged vertical sectional view of the front bumper 12 taken at one corner region thereof. As illustrated in FIGS. 13 and 14, in the vehicle bumper structure of the third embodiment, a collision detection sensor 70 is offset or off-centered to an upper portion of the front surface of the front wall portion 30A of the front-bumper reinforcement 30. That is, the collision detection sensor 70 has a vertical width smaller than that of the front-bumper reinforcement 30. In the meantime, the collision detection sensor 70 used is a surface pressure sensor for sensing a surface pressure in an analogue fashion and detects the occurrence or absence of collision depending on whether the surface pressure thus sensed exceeds a predetermined threshold value.

A front-bumper absorber 72 is formed in a single layer structure and not a two-layer structure of a hard and a soft layer. As illustrated in FIG. 13, at the center cross-section, a main body portion 72A of the front-bumper absorber 72 is arranged contiguous to the collision detection sensor 70 and a support leg portion 72B of a grapple shape is integrally formed with the main body portion 72A so as to extend in substantially "L"-shape toward the vehicle's rear side from a forefront bottom edge of the main body portion 72A. The support leg portion 72B has a rear end disposed in contact with a bottom portion of the front surface of the front wall portion 30A of the front-bumper reinforcement 30. Alternatively, the rear end of the support leg portion 72B may be slightly spaced apart from the lower portion of the front surface of the front wall portion 30A of the front-bumper reinforcement 30. Turning to FIG. 14, in the vicinity of bumper corners, a main body portion 72A of the front-bumper absorber 72 has a reduced thickness and a support leg portion 72B' has a thickness greater than that of the support leg portion 72B at the bumper center. The support leg portion 72B' has a rear end disposed in contact with the lower portion of the front surface of the front wall portion 30A of the front-bumper reinforcement 30. Alternatively, the rear end of the support leg portion 72B' may be spaced slightly apart from the lower front surface of the front wall portion 30A of the front-bumper reinforcement 30.

With the configuration described above, the vertical width of the collision detection sensor 70 is equal to about one half of the vertical width of the front-bumper reinforcement 30, so that the front bumper 12 can be reduced in size in proportion to the front-bumper reinforcement 30.

If the front bumper 12 collides with an object such as a pedestrian or the like at the central portion thereof, most of the impact load is transferred to the collision detection sensor 70 through the main body portion 72A of the front-bumper absorber 72 because the portion between the main body portion 72A and the support leg portion 72B of the front-bumper absorber 72 is cut away in the center cross-section thereof. That is, an extremely small amount of load is dispersed and transferred to the front-bumper reinforcement 30 through the support leg portion 72B. This means that, at the center cross-section, the impact load is mostly input through the main body portion 72A to the collision detection sensor 70, thereby allowing the collision detection sensor 70 to precisely sense the impact load.

On the other hand, if the front bumper 12 collides with an object at the corner portions thereof, the load that is input to the collision detection sensor 70 essentially tends to become too great because the main body portion 72A' has a reduced thickness. In the present embodiment, however, more than one half of the impact load is dispersed and transferred to the front-bumper reinforcement 30 through the support leg portion 72B'. This reduces the amount of load transferred through the main body portion 72A' to the collision detection sensor 70.

As is apparent from the foregoing, the present embodiment increases the output (sensitivity) of the collision detection sensor 70 at the bumper center portion and decreases sensitivity at the bumper corner portions. As a result, in accordance with the present embodiment, it is possible to reduce the overall bumper size and further to reduce variations in the output of the collision detection sensor 70.

Moreover, presence of the support leg portion 72B at the center cross-section helps to obtain an appropriate level of rigidity when a vehicle user rests against the front bumper cover 26.

Further, in the present embodiment, the front-bumper absorber 72 is formed in a single layer structure with a cross-sectional shape that changes at the center and corner portions, so that it can be easily manufactured as compared with the case of producing a front-bumper absorber with soft and hard layers.

Additionally, in the present embodiment, it is easy to sense collision with an object such as a pedestrian or the like because the collision detection sensor 70 is offset to the upper portion of the front surface of the front-bumper reinforcement 30. In other words, because the center of gravity of the pedestrian lies at a higher level than the front-bumper absorber 72, when a vehicle collides with a pedestrian, the pedestrian generally falls toward the top portion of the front bumper 12 on his or her legs. Accordingly, the load can be easily sensed if the collision detection sensor 70 is offset to the upper portion of the front surface of the front-bumper reinforcement 30. This means that the present embodiment provides enhanced detectability of collision with a pedestrian.

Figure 15:
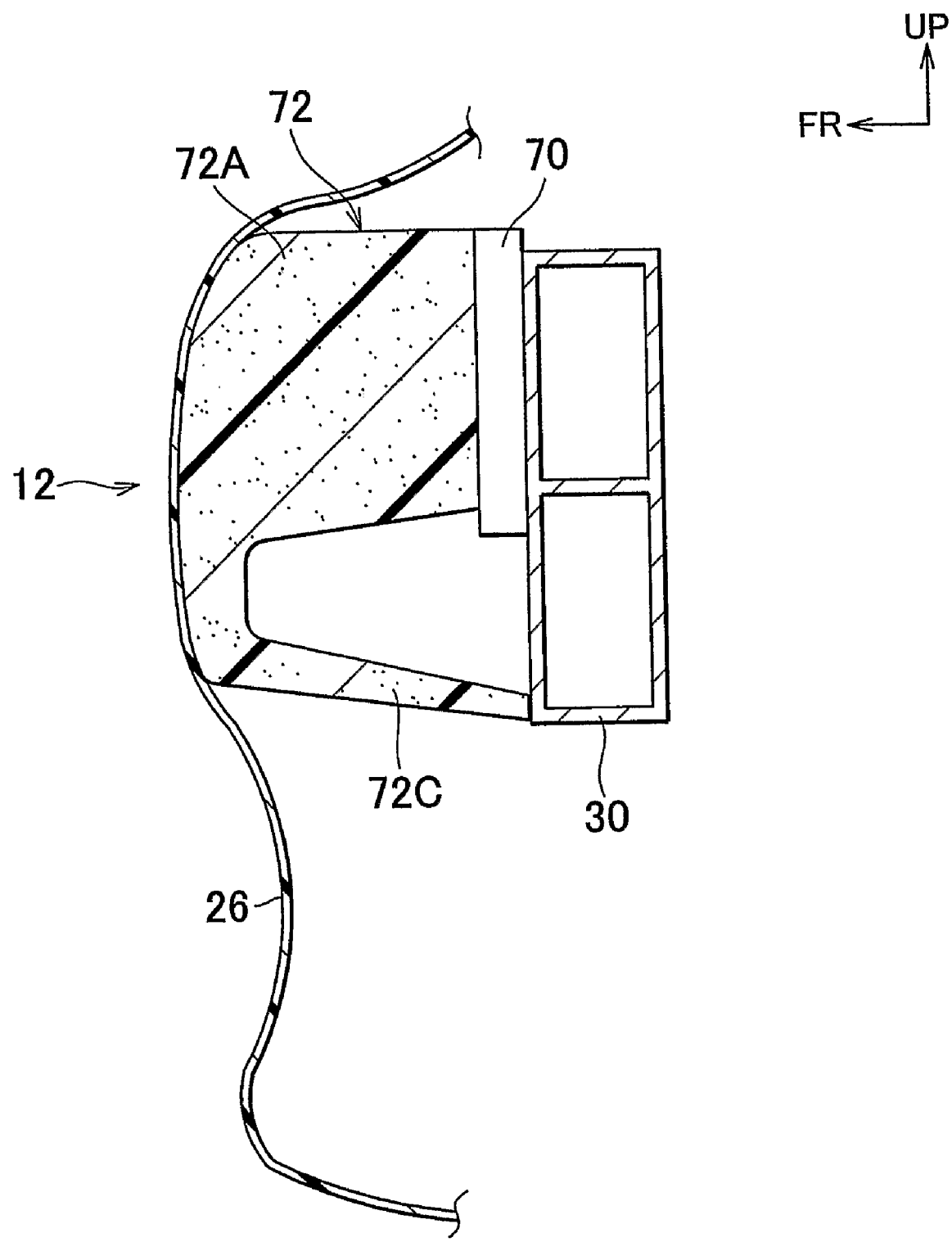
FIG. 15 is a partially enlarged vertical sectional view, corresponding to FIG. 13, showing a first modified example of the third embodiment in which a support leg portion inclindely extends downwardly.
Figure 16:
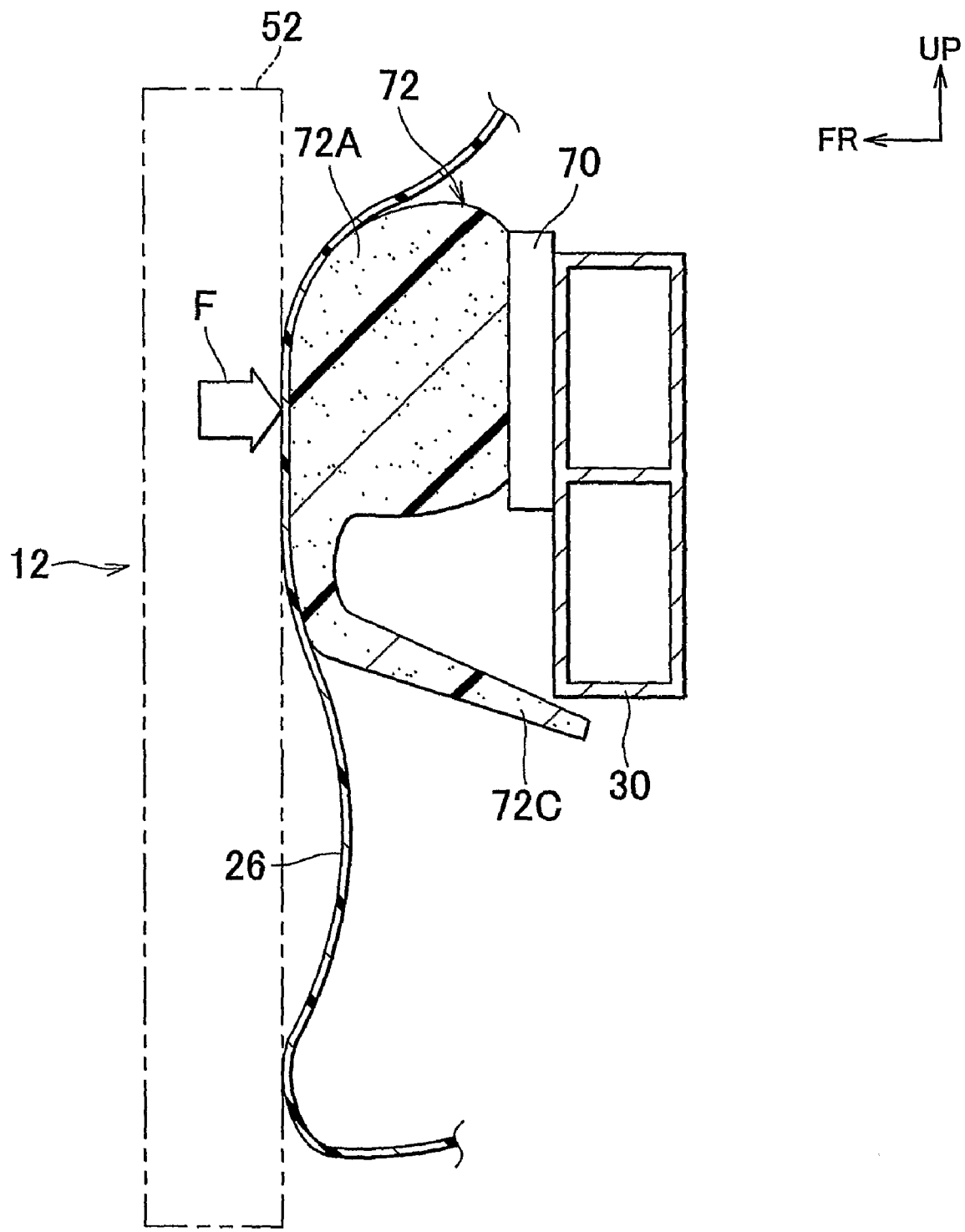
FIG. 16 is a partially enlarged vertical sectional view, corresponding to FIG. 15, illustrating a state that collision has occurred from the condition shown in FIG. 15.

In a modified example of the third embodiment illustrated in FIGS. 15 and 16, at a center cross-section, the support leg portion 72C does not extend horizontally in the vehicle longitudinal direction but is inclined down and towards the rear. Furthermore, the support leg portion 72C has a rear end that contacts a bottom portion of the front surface of the front wall portion 30A of the front-bumper reinforcement 30.

With the configuration noted just above, the rear end of the support leg portion 72C remains in contact with the front surface of the front-bumper reinforcement 30 in the condition illustrated in FIG. 15. If the vehicle collides with an object in this condition, the support leg portion 72C, which is inclined down and towards the rear, is released from the front surface of the front-bumper reinforcement 30 as shown in FIG. 16 after exhibiting a certain level of reaction force thereto, that is, after keeping the main body portion 72A from rotating toward the lower portion of the front surface of the front-bumper reinforcement 30 at the early collision stage. Once the support leg portion 72C is released, the entire impact load is transferred to the collision detection sensor 70 through the main body portion 72A. This increases the transfer efficiency of the load to the collision detection sensor 70. As a result, in accordance with the present modified example, variations in the output of the collision detection sensor 70 may be reduced by simply changing the cross-sectional shape of the front bumper 12.

Figure 14:
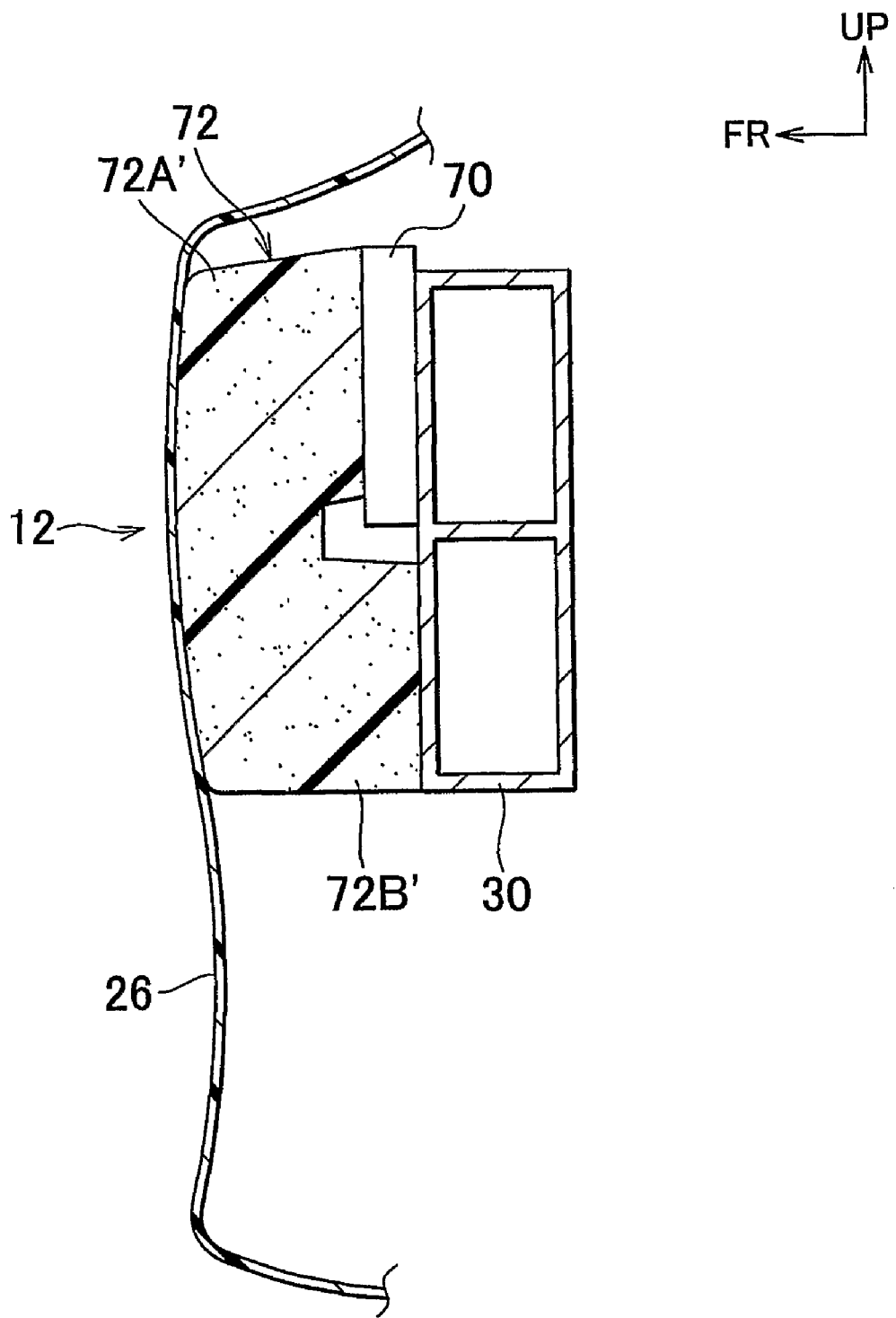
FIG. 14 is a partially enlarged vertical sectional view taken at one corner region, showing major parts of the vehicle bumper structure in accordance with the third embodiment of the present invention.
Figure 17:
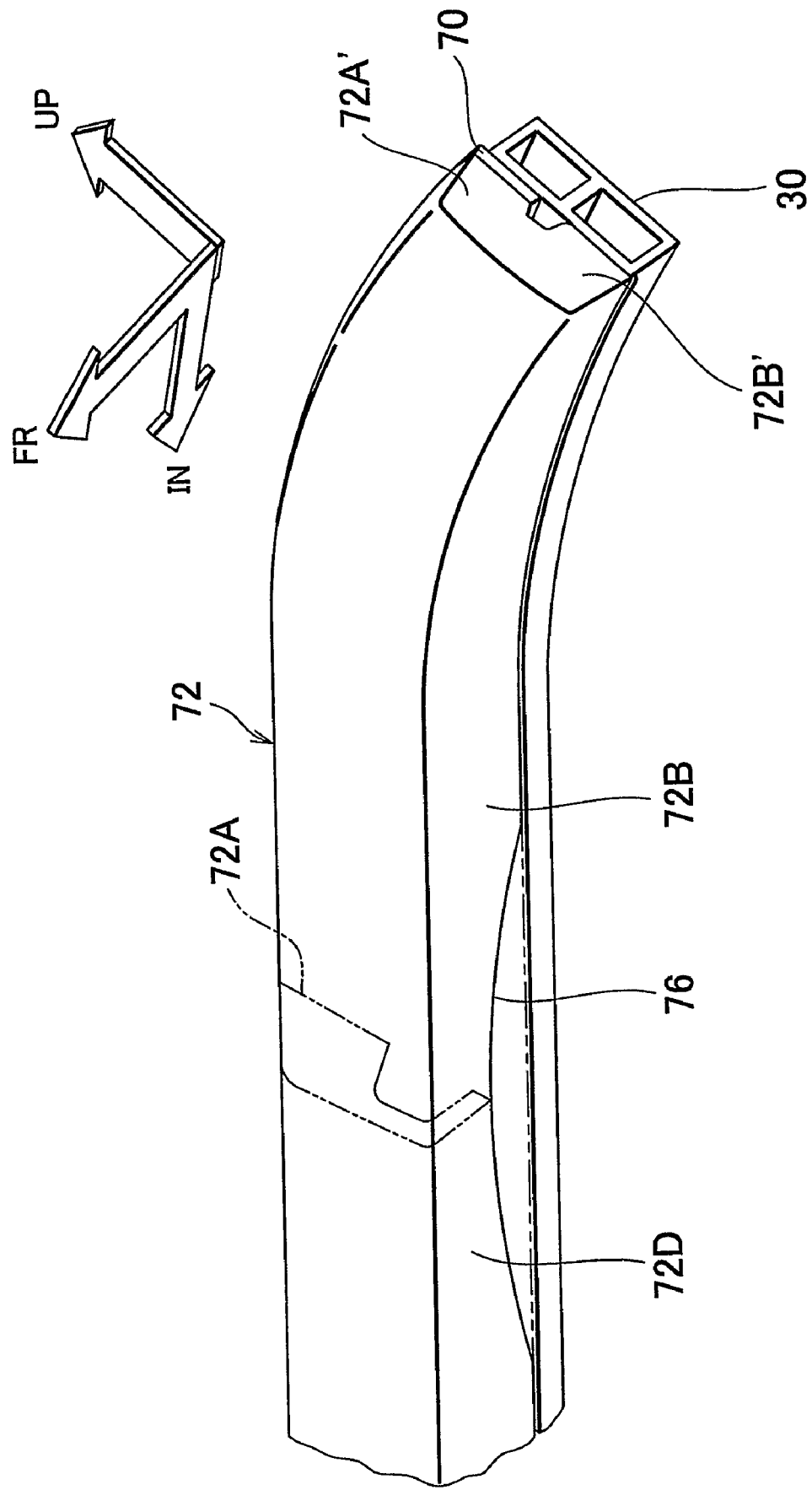
FIG. 17 is a partially enlarged perspective view showing a second modified example of the third embodiment in which a support leg portion is cut away at its bumper center region.

Another modified example of the third embodiment shown in FIG. 17 has a feature different from the configuration illustrated in FIGS. 13 and 14 in that, the front-bumper absorber 72 has a support leg portion 72B whose bumper center portion is cut away in an arcuate shape at the vehicle-rear side thereof. Provision of such a cutout portion 76 at the bumper center portion of the support leg portion 72B makes sure that, within the range of the cutout portion 76, the support leg portion 72B becomes short in length and looses its intrinsic support function (the shortened support leg portion is designated by reference numeral "72D").

With the configuration set forth just above, because of the shortened length of the support leg portion 72D, the rear end of the support leg portion 72D would not reach the front surface of the front-bumper reinforcement 30 when the bumper collides with an object at the bumper center region. In other words, the support leg portion 72D remains out of contact with the front surface of the front-bumper reinforcement 30. For this reason, the entire impact load is concentrated on the main body portion 72A of the front-bumper absorber 28 and transferred to the collision detection sensor 70 through the main body portion 72A of the front-bumper absorber 28. This further increases the transfer efficiency of the load from the front-bumper absorber 72 to the collision detection sensor 70. As a result, in accordance with the present modified example, variations in the output of the collision detection sensor 70 may be reduced by simply changing the cross-sectional shape of the front bumper absorber 72.

Figure 18:
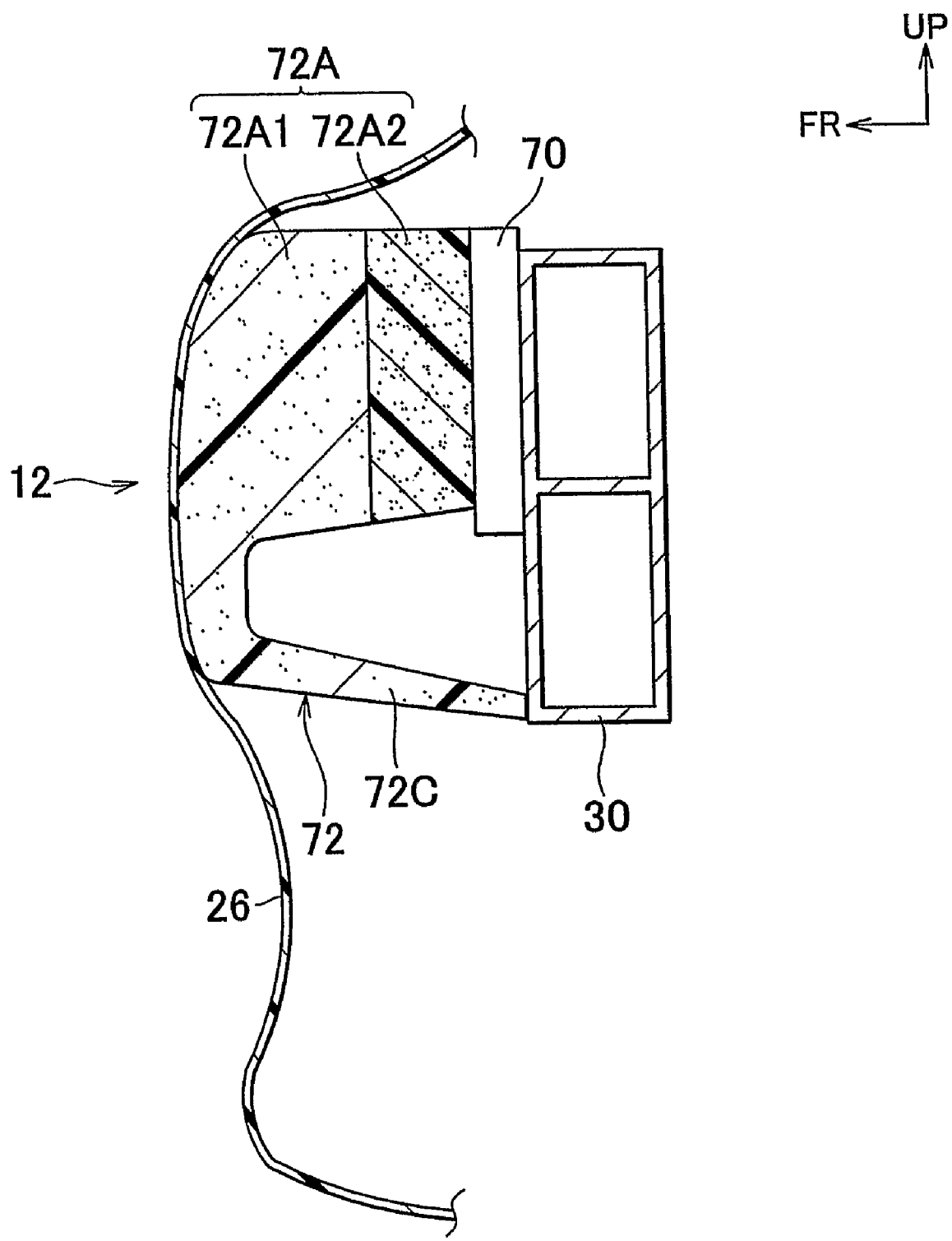
FIG. 18 is a partially enlarged vertical sectional view, corresponding to FIG. 15, showing a third modified example of the third embodiment in which the main body portion of an absorber has a structure of two hard and soft layers.

In still another modified example of the third embodiment, illustrated in FIG. 18, the front-bumper absorber 72 has essentially the same cross section shape as that of the front-bumper absorber 72 shown in FIGS. 15 and 16. The present modified example has a feature in that the main body portion 72A is formed in a two-layer structure of hard and soft layers as described in the first embodiment rather than a single layer structure. The front side of the main body portion 72A is formed of a soft absorber 72A1 and the rear side of the main body portion 72A is formed of a hard absorber 72A2.

With the aforementioned configuration, the transfer loss of impact load is reduced by the arrangement of the hard absorber 72A2 on the front surface of the collision detection sensor 70. Thus, there are simultaneously obtained both the effect of enhancing the load transfer efficiency to the collision detection sensor 70 and the effect of matching a thicker absorber and a thinner absorber in their characteristics as set forth in connection with the first embodiment. Accordingly, in accordance with the present modified example, variations in the output of the collision detection sensor 70 can be suppressed by changing the cross-sectional shape of the front-bumper absorber 72 and forming the front-bumper absorber 72 in hard and soft plural layers. This significantly reduces variations in the output of the collision detection sensor 70. The hard absorber 72A2 shown in FIG. 18 can also be applied to the front-bumper absorber 72 shown in FIG. 17.

Figure 19:
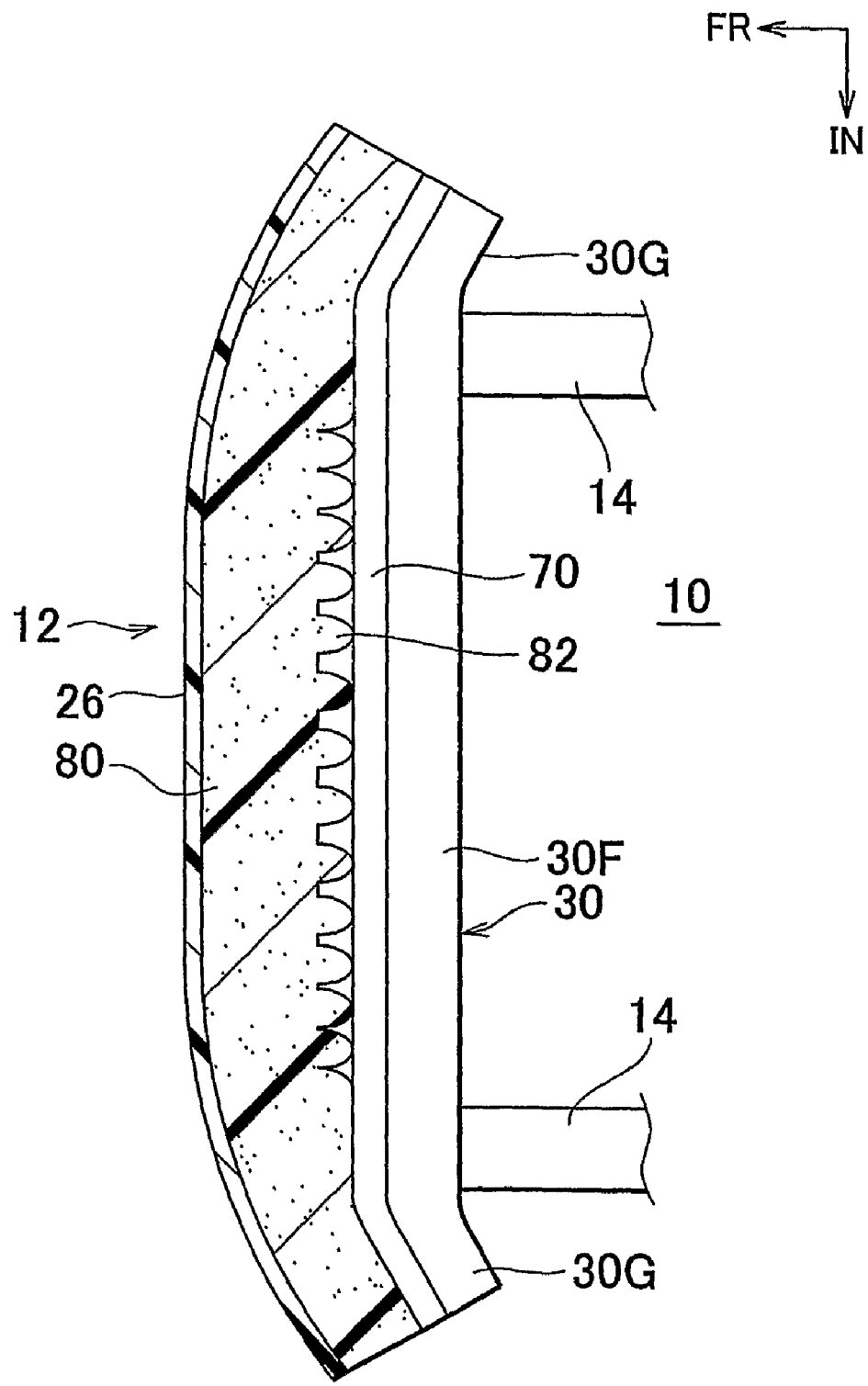
FIG. 19 is a horizontal sectional view, corresponding to FIG. 10, showing a fourth modified example of the third embodiment in which an irregularity portion is formed only on the rear surface of the absorber at the bumper center region.

Still another modified example, shown in FIG. 19, includes an irregularity portion 82 as described with respect to the second embodiment that is formed only at the central portion of the surface of the front-bumper absorber 80 facing the collision detection sensor 70. The irregularity portion 82 has an increased pitch at the center and a reduced pitch at the both ends.

It may be generally considered that the load is apt to be dispersed at the bumper center region where the front-bumper absorber 80 has an increased thickness. In the present modified example, however, the load transfer performance to the collision detection sensor 70 at the bumper center region is increased because the irregularity portion 82 is formed only at the central portion of the surface of the front-bumper absorber 80 facing the collision detection sensor 70. This effectively reduces variations in the output of the collision detection sensor 70.

Figure 20:
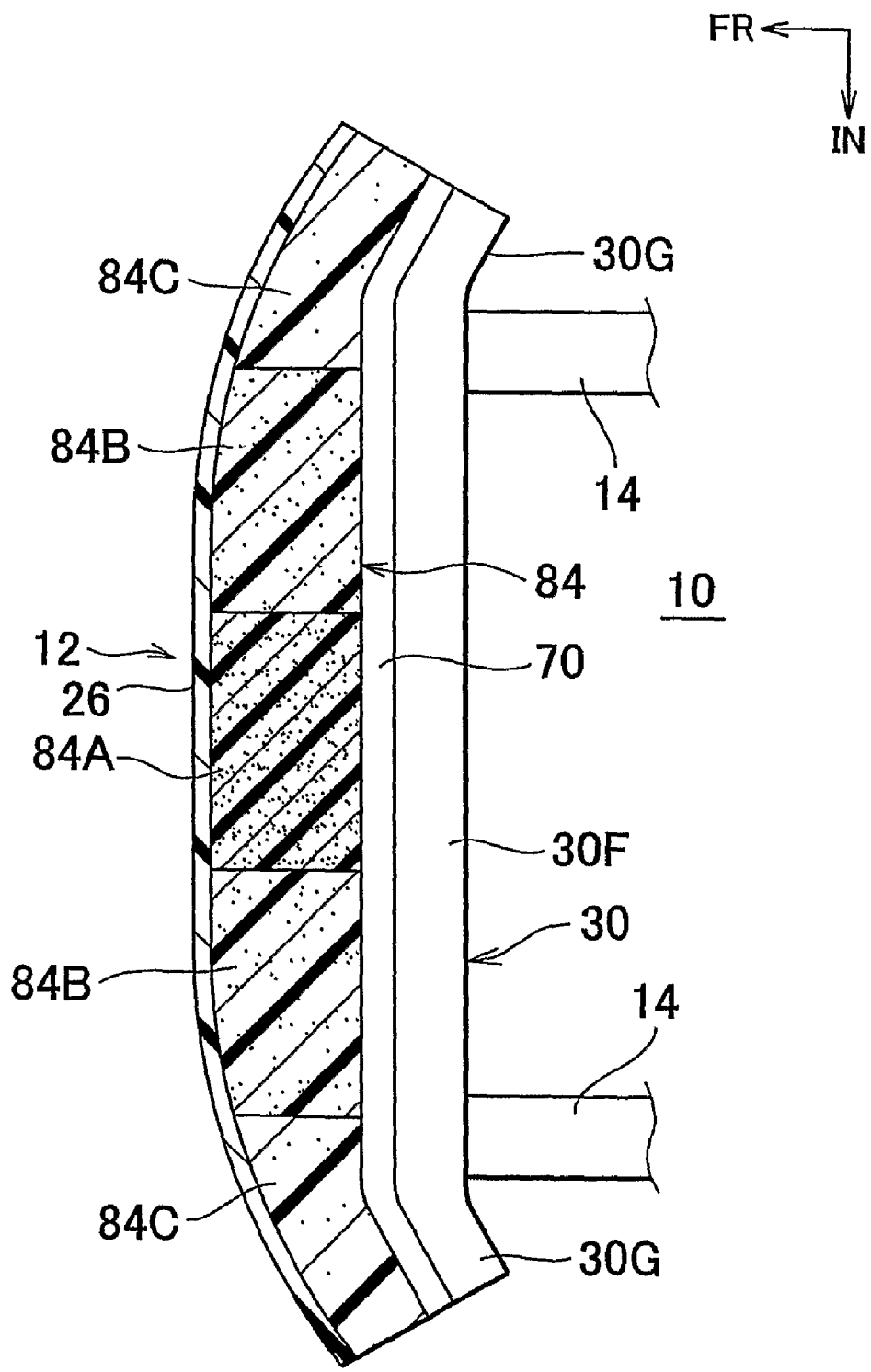
FIG. 20 is a horizontal sectional view, corresponding to FIG. 10, showing a fifth modified example of the third embodiment in which the foaming ratio of an absorber varies in a bumper width direction.

Still another modified example shown in FIG. 20 has a feature in that a front-bumper absorber 84 has different foaming ratios at a bumper center region and at bumper corner regions. Specifically, the front-bumper absorber 84 includes a center absorber 84A of a lowest foaming ratio provided at the bumper center region, corner absorbers 84C of a highest foaming ratio arranged at the bumper corner regions, and intermediate absorbers 84B of a medium foaming ratio placed between the center absorber 84A and the corner absorbers 84C. In a nutshell, the front-bumper absorber 84 is formed to have various foaming ratios depending on the thickness thereof.

With the configuration stated just above, the center absorber 84A is hardest and the corner absorbers 84C are softest because the front-bumper absorber 84 becomes softer as the foaming ratio increases. For this reason, a relatively high load is transferred to the collision detection sensor 70 at the bumper center region and a relatively small load is transferred to the collision detection sensor 70 at the bumper corner regions. As a consequence, in accordance with the present modified example, it is possible to effectively reduce variations in the output of the collision detection sensor 70.

Alternatively, the foaming ratios may be set in two levels. The above-noted configuration can be attained by foaming a material within a mold in which partition members extending in the vehicle longitudinal direction are placed at borders of the different foaming ratios.

Figure 21:
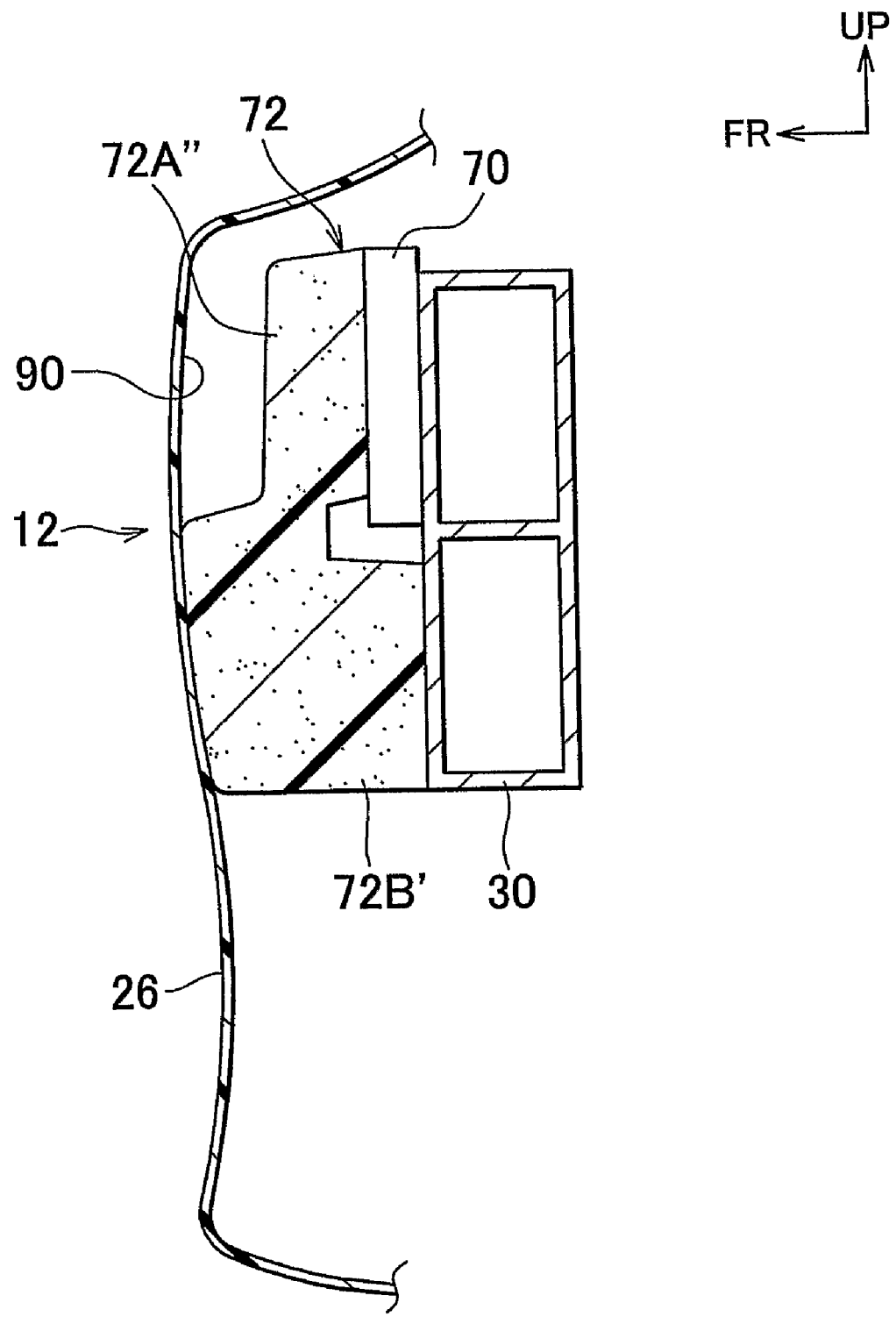
FIG. 21 is a partially enlarged vertical sectional view, corresponding to FIG. 14, showing a sixth modified example of the third embodiment.

Still another modified example shown in FIG. 21 has a feature different from the configuration illustrated in FIG. 14 in that the main body portions 72A' of the front-bumper absorber 72 lying at the corner regions are further reduced in thickness in the vehicle longitudinal direction, thus providing a gap 90 between the front bumper cover 26 and a thin main body portion 72A".

With the configuration described above, because the main body portions 72A" of the front-bumper absorber 72 lying at the corner regions are reduced in thickness to form the gap 90, the front bumper cover 26 can be displaced free of resistance in the gap 90 at the time of collision. This makes it possible to further reduce the load that is input to the collision detection sensor 70 at the bumper corner regions.

Figure 22:
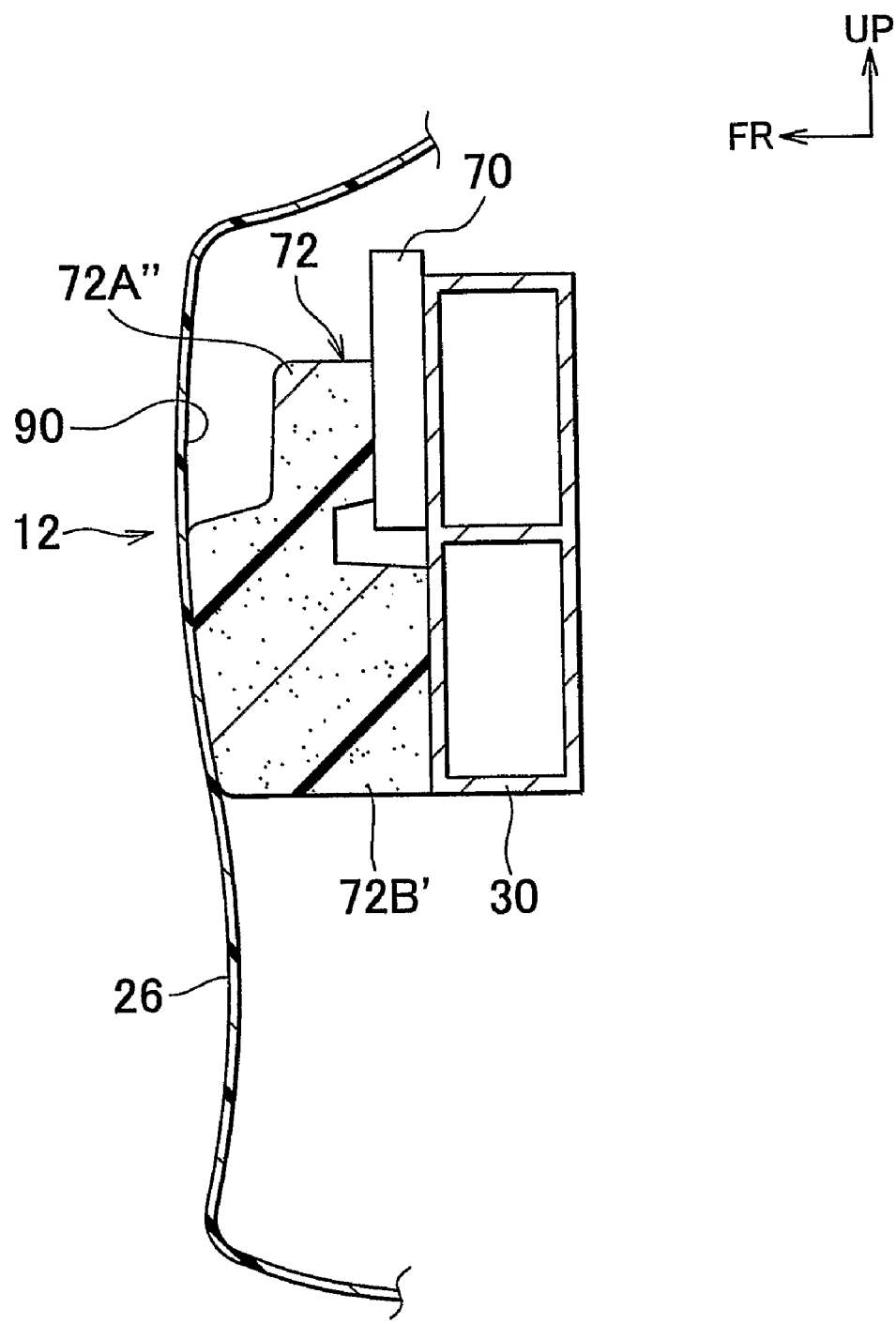
FIG. 22 is a partially enlarged vertical sectional view, corresponding to FIG. 14, showing a seventh modified example of the third embodiment.

Still another modified example shown in FIG. 22 has a feature different from the configuration illustrated in FIG. 21 in that the top portions of the main body portions 72A" of the front-bumper absorber 72 lying at the corner regions are cut away to further reduce the load that is input to the collision detection sensor 70.

Although the front-bumper absorber 28 formed in the two-layer structure of the soft absorber 54 and the hard absorber 56 is employed in the first embodiment, the present invention is not limited thereto. A structure having three or more layers that incorporates additional hard and soft layers may be employed.

Although the front-bumper absorber 28 formed in the two layers of the soft absorber 54 and the hard absorber 56 has been described in the first embodiment, the present invention is not limited thereto. The hard absorber 56 may be provided independently of the bumper shock-absorbing member. For example, a member ("load transfer member" in the second aspect of the invention) corresponding to the hard absorber 56 may be formed in advance by resin-molding and then secured to the front surface of the front-bumper reinforcement by means of a fastener. Meanwhile, the front-bumper absorber is formed of only the soft absorber 54 having a generally uniform thickness in the vehicle width direction. Then, the front-bumper absorber is set to the front surface of the load transfer member. By doing so, it is possible to obtain the same operation and effect as that described in the first embodiment. Furthermore, the front-bumper absorber may be formed from a resin-molded product of a rib structure or a honeycomb structure, instead of a foam material.

Unlike the front-bumper absorber, the load transfer member in the above-noted configuration has substantially no energy absorbing function and hence serves as a member for transferring the impact load to the collision detection sensor. In other words, the purpose of the present invention can be accomplished even if the vehicle bumper structure is formed of a composite body including a front-bumper absorber having a generally uniform thickness in the vehicle width direction and a load transfer member falling outside the concept of an absorber.

While the invention has been shown and described with respect to the preferred embodiments, it will be understood by those skilled in the art that various changes and modifications may be made without departing from the scope of the invention as defined in the claims.

The invention claimed is:

1. A vehicle bumper structure comprising:
   a bumper cover arranged at an outermost side of a vehicle and extending in a vehicle width direction;
   a bumper reinforcing member disposed spaced apart from the bumper cover toward the inside of the vehicle, the bumper reinforcing member extending in the vehicle width direction;
   a load-sensing unit for sensing an impact load in a vehicle longitudinal direction, the load-sensing unit being arranged on an outside or an inside surface of the bumper reinforcing member; and
   a bumper shock-absorbing member arranged between the bumper cover and the bumper reinforcing member and extending in the vehicle width direction,
   wherein the bumper shock-absorbing member has a bumper center region and bumper corner regions which differ in at least one of a cross-sectional shape, a cross-sectional structure and a hardness from each other, so that variations in an output of the load-sensing unit are reduced; and
   the bumper shock-absorbing member is formed in a plural layer structure including a relatively soft layer and a relatively hard layer, the hard layer being thicker at the bumper center region in the vehicle width direction and being thinner or being not present at the bumper corner regions in the vehicle width direction.

2. The vehicle bumper structure according to claim 1, wherein the hard layer is arranged at an inner side and the soft layer is arranged at an outer side in the vehicle longitudinal direction.

3. The vehicle bumper structure according to claim 1, wherein the hard layer is arranged at an outer side and the soft layer is arranged at an inner side in the vehicle longitudinal direction.

4. The vehicle bumper structure according to claim 1, wherein the soft layer has a generally uniform thickness in the vehicle longitudinal direction over an entire extent of the soft layer in the vehicle width direction.

5. The vehicle bumper structure according to claim 1, wherein:
   the bumper shock-absorbing member is made of a foam material; and
   the soft layer has a foaming ratio which is equal to or greater than a product of four multiplied by a foaming ratio of the hard layer.

6. The vehicle bumper structure according to claim 1, wherein the hard layer extends over the entire extent of the bumper in the vehicle width direction.

7. The vehicle bumper structure according to claim 2, wherein the hard layer has an irregularity portion on a surface of the hard layer facing the load-sensing unit.

8. The vehicle bumper structure according to claim 3, wherein the hard layer has an irregularity portion on a surface of the hard layer facing the soft layer.

9. The vehicle bumper structure according to claim 7, wherein the irregularity portion has a greater protrusion length in the vehicle longitudinal direction at the bumper center region than at the bumper corner regions.

10. The vehicle bumper structure according to claim 8, wherein the irregularity portion has a greater protrusion length in the vehicle longitudinal direction at the bumper center region than at the bumper corner regions.

11. The vehicle bumper structure according to claim 7, wherein the irregularity portion has a smaller ridge-to-ridge pitch at the bumper center region than at the bumper corner regions.

12. The vehicle bumper structure according to claim 8, wherein the irregularity portion has a smaller ridge-to-ridge pitch at the bumper center region than at the bumper corner regions.

13. The vehicle bumper structure according to claim 1, wherein the bumper shock-absorbing member has an irregularity portion formed only at a bumper central portion of a surface of the bumper shock-absorbing member facing the load-sensing unit.

14. The vehicle bumper structure according to claim 1, wherein the bumper shock-absorbing member has different foaming ratios at the bumper center region and at the bumper corner regions, the foaming ratio at the bumper center region being smaller than that at the bumper corner regions.

15. The vehicle bumper structure according to claim 1, wherein the bumper shock-absorbing member includes:
   a first load transfer part for transferring the load to the load-sensing unit, the first load transfer part facing the load-sensing unit; and
   a second load transfer part for transferring the load to the bumper reinforcing member, the second load transfer part facing the bumper reinforcing member and being apart from the first load transfer part, wherein a thickness of the first load transfer part in the vehicle longitudinal direction at the bumper corner regions is thinner than the thickness of the second load transfer part, and a gap is provided between the bumper cover and the first load transfer part.

16. The vehicle bumper structure according to claim 1, wherein the load-sensing unit is arranged on the outside surface of the bumper reinforcing member and extends in a lengthwise direction of the bumper reinforcing member.

17. The vehicle bumper structure according to claim 1, wherein the load-sensing unit is one of an elongated optical fiber sensor, an on-off sensor and a surface pressure sensor.

18. A bumper shock-absorbing member for a vehicle bumper structure, wherein the vehicle bumper structure includes
 a bumper cover arranged at an outermost side of a vehicle and extending in a vehicle width direction;
 a bumper reinforcing member disposed spaced apart from the bumper cover toward the inside of the vehicle, the bumper reinforcing member extending in the vehicle width direction; and
 a load-sensing unit for sensing an impact load in a vehicle longitudinal direction, the load-sensing unit being arranged on an outside or an inside surface of the bumper reinforcing member;
 wherein the bumper shock-absorbing member is configured to be arranged between the bumper cover and the bumper reinforcing member and to extend in the vehicle width direction;
 wherein the bumper shock-absorbing member has a bumper center region and bumper corner regions which differ in at least one of a cross-sectional shape, a cross-sectional structure and a hardness from each other, so that variations in an output of the load-sensing unit are reduced; and
 wherein the bumper shock-absorbing member is formed in a plural layer structure including a relatively soft layer and a relatively hard layer, the hard layer being thicker at the bumper center region in the vehicle width direction and being thinner or being not present at the bumper corner regions in the vehicle width direction.

19. A vehicle bumper structure comprising:
 a bumper cover arranged at an outermost side of a vehicle and extending in a vehicle width direction;
 a bumper reinforcing member disposed spaced apart from the bumper cover toward the inside of the vehicle, the bumper reinforcing member extending in the vehicle width direction;
 a load-sensing unit for sensing an impact load, the load-sensing unit arranged on an outside or an inside surface of the bumper reinforcing member in a vehicle longitudinal direction;
 a bumper shock-absorbing member arranged between the bumper cover and the bumper reinforcing member and extending in the vehicle width direction; and
 a load transfer member arranged between the bumper shock-absorbing member and the bumper reinforcing member or between the bumper cover and the bumper shock-absorbing member, the load transfer member being harder than the bumper shock-absorbing member, thicker at the bumper center region in the vehicle width direction and thinner or being not present at the bumper corner regions so as to reduce variations in an output of the load sensing unit.

20. The vehicle bumper structure according to claim 19, wherein the load-sensing unit is arranged on the outside surface of the bumper reinforcing member and extends in a lengthwise direction of the bumper reinforcing member.

21. The vehicle bumper structure according to claim 19, wherein the load-sensing unit is one of an elongated optical fiber sensor, an on-off sensor and a surface pressure sensor.

22. A bumper shock-absorbing member for a vehicle bumper structure, wherein the vehicle bumper structure includes
 a bumper cover arranged at an outermost side of a vehicle and extending in a vehicle width direction;
 a bumper reinforcing member disposed spaced apart from the bumper cover toward the inside of the vehicle, the bumper reinforcing member extending in the vehicle width direction;
 a load-sensing unit for sensing an impact load, the load-sensing unit arranged on an outside or an inside surface of the bumper reinforcing member in a vehicle longitudinal direction;
 wherein the bumper shock-absorbing member is configured to be arranged between the bumper cover and the bumper reinforcing member and to extend in the vehicle width direction; and
 wherein the vehicle bumper structure further includes a load transfer member arranged between the bumper shock-absorbing member and the bumper reinforcing member or between the bumper cover and the bumper shock-absorbing member, the load transfer member being harder than the bumper shock-absorbing member, thicker at the bumper center region in the vehicle width direction and thinner or being not present at the bumper corner regions so as to reduce variations in an output of the load-sensing unit.

\* \* \* \* \*